(12) United States Patent
Uemura et al.

(10) Patent No.: US 10,156,973 B2
(45) Date of Patent: Dec. 18, 2018

(54) SCORE DISPLAYING METHOD AND STORAGE MEDIUM

(71) Applicant: YAMAHA CORPORATION, Hamamatsu-shi (JP)

(72) Inventors: Norihiro Uemura, Hamamatsu (JP); Motoichi Tamura, Hamamatsu (JP); Yasuyuki Umeyama, Hamamatsu (JP); Takuya Fujishima, Hamamatsu (JP); Yoshihiro Katsumata, Hamamatsu (JP); Kazuki Kashiwase, Hamamatsu (JP); Motoji Nagata, Hamamatsu (JP); Akira Maezawa, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 516 days.

(21) Appl. No.: 14/669,190

(22) Filed: Mar. 26, 2015

(65) Prior Publication Data

US 2015/0277731 A1    Oct. 1, 2015

(30) Foreign Application Priority Data

Mar. 26, 2014  (JP) ................... 2014-064268
Feb. 27, 2015  (JP) ................... 2015-038924

(51) Int. Cl.
*G06F 3/0484*  (2013.01)
*G06F 3/0483*  (2013.01)
(Continued)

(52) U.S. Cl.
CPC ........ *G06F 3/04847* (2013.01); *G06F 3/0483* (2013.01); *G06F 3/04842* (2013.01);
(Continued)

(58) Field of Classification Search
CPC ....... G10H 2220/015; G10H 2220/101; G10H 1/0008; G10H 2240/141; G10H 2220/391;
(Continued)

(56) References Cited

U.S. PATENT DOCUMENTS 5,689,077 A * 11/1997 Jasinski ............... G09B 15/002
                                                      84/477 R
5,706,363 A    1/1998 Kikuchi
(Continued)

FOREIGN PATENT DOCUMENTS

JP    0535924 A    2/1993
JP    06102869 A   4/1994
(Continued)

OTHER PUBLICATIONS

Extended European Search Report issued in EP15160495.6, dated Sep. 1, 2015.
(Continued)

*Primary Examiner* — William L Bashore
*Assistant Examiner* — Daniel W Parcher
(74) *Attorney, Agent, or Firm* — Rossi, Kimms & McDowell LLP

(57) ABSTRACT

Once obtained a turn-over instruction to proceed a score on one image area to which one grand staff among plural grand staves displayed on a screen of a user I/F belongs, a controller of a score displaying apparatus performs a process of scrolling the image areas upward on the screen of the user I/F, disposing the image area on which the turn-over instruction is accepted at a highest level of the screen of the user I/F, sequentially aligning a plurality of consecutive image areas in a forward direction on a timeline of the score with respect to the image area on which the turn-over instruction is accepted below the image area on which the turn-over
(Continued)

instruction is accepted, and displaying the image areas on the screen of the user I/F.

12 Claims, 20 Drawing Sheets

(51) Int. Cl.
    *G10G 1/00*     (2006.01)
    *G10H 1/00*     (2006.01)

(52) U.S. Cl.
    CPC .............. *G10G 1/00* (2013.01); *G10H 1/0008* (2013.01); *G10H 2220/015* (2013.01); *G10H 2220/101* (2013.01); *G10H 2220/391* (2013.01); *G10H 2240/141* (2013.01)

(58) Field of Classification Search
    CPC ............. G06F 3/04847; G06F 3/04842; G06F 3/0483; G10G 1/00
    See application file for complete search history.

(56) References Cited

U.S. PATENT DOCUMENTS

| | | | |
|---|---|---|---|
| 2001/0023633 A1 | 9/2001 | Matsumoto | |
| 2001/0054347 A1* | 12/2001 | Uehara | G09B 15/023 |
| | | | 84/477 R |
| 2003/0005814 A1* | 1/2003 | Matsumoto | G09B 15/02 |
| | | | 84/477 R |
| 2003/0100965 A1* | 5/2003 | Sitrick | G09B 15/023 |
| | | | 700/83 |
| 2005/0204889 A1* | 9/2005 | Swingle | G10G 1/00 |
| | | | 84/100 |
| 2008/0060500 A1* | 3/2008 | La | G10G 1/00 |
| | | | 84/486 |
| 2009/0262091 A1 | 10/2009 | Ikeda et al. | |
| 2010/0095240 A1* | 4/2010 | Shiplacoff | G06F 3/0483 |
| | | | 715/784 |
| 2011/0237303 A1 | 9/2011 | Matsuda | |
| 2013/0283999 A1* | 10/2013 | Clarke | G09B 15/02 |
| | | | 84/477 R |
| 2014/0000438 A1 | 1/2014 | Feis et al. | |
| 2015/0070283 A1* | 3/2015 | Irwin | G06F 3/0416 |
| | | | 345/173 |

FOREIGN PATENT DOCUMENTS

| | | |
|---|---|---|
| JP | 06102870 A | 4/1994 |
| JP | 06102871 A | 4/1994 |
| JP | 2001265325 A | 9/2001 |
| JP | 2001265327 A | 9/2001 |
| JP | 2003015636 A | 1/2003 |
| JP | 2003177745 A | 6/2003 |
| JP | 2010015239 A | 1/2010 |
| JP | 2011198316 A | 10/2011 |
| JP | 2012252620 A | 12/2012 |
| WO | 0150452 A2 | 7/2001 |
| WO | 2005062289 A1 | 7/2005 |

OTHER PUBLICATIONS

Office Action issued in Japanese Appln. No. 2015-038924 dated Feb. 24, 2017. English translation provided.

Office Action issued in Japanese Patent Application No. 2015-033924 dated Oct. 3, 2017. English translation provided.

\* cited by examiner

{Fig. 1}
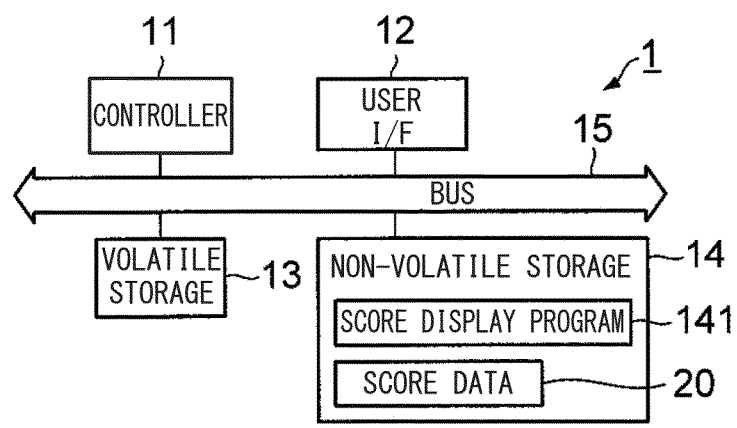

{Fig. 2}
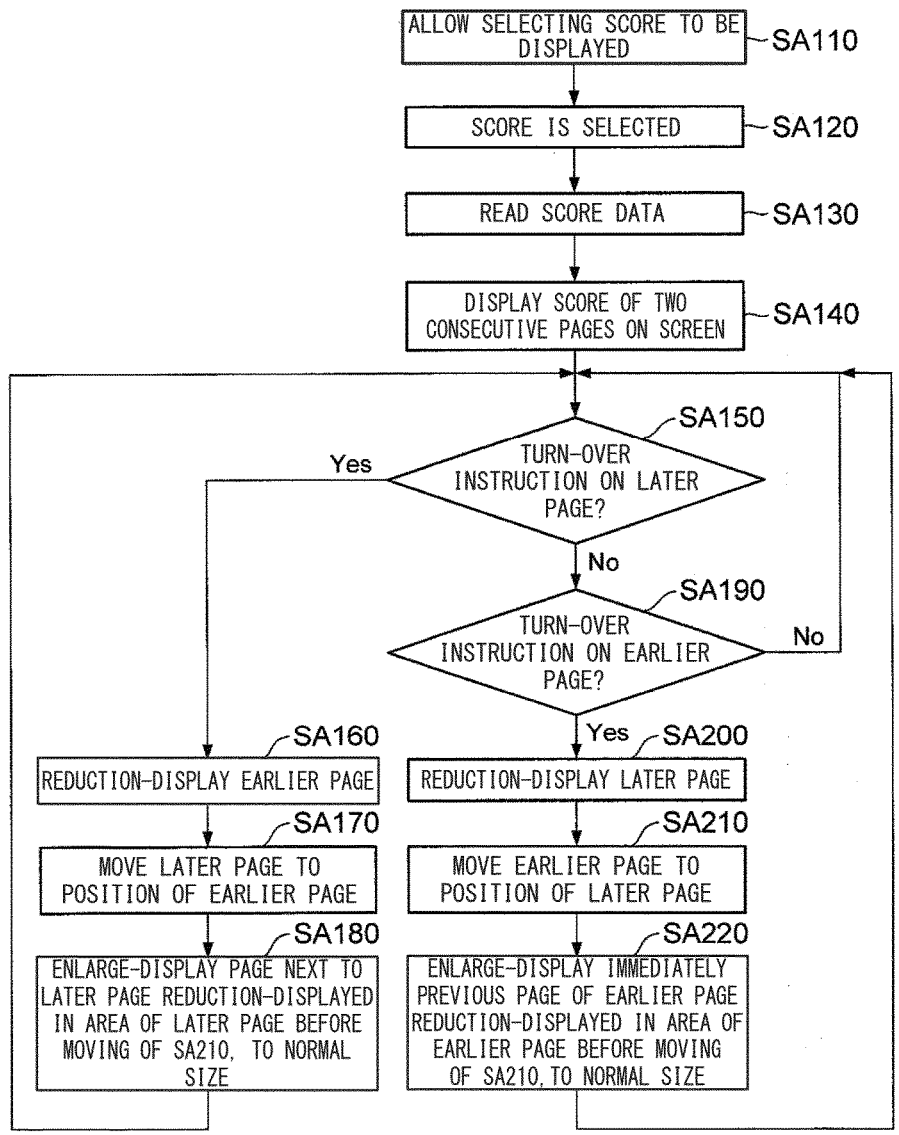

{Fig. 3A}
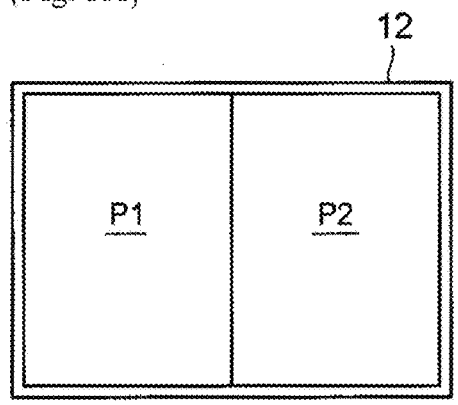
{Fig. 3B}
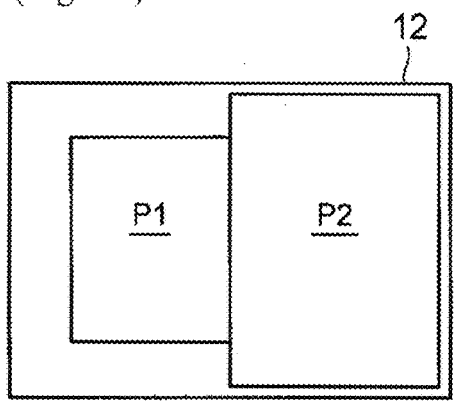
{Fig. 3C}
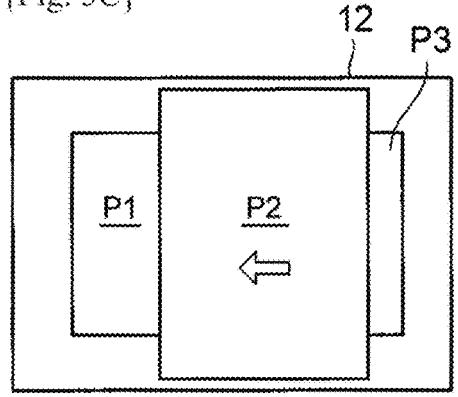
{Fig. 3D}
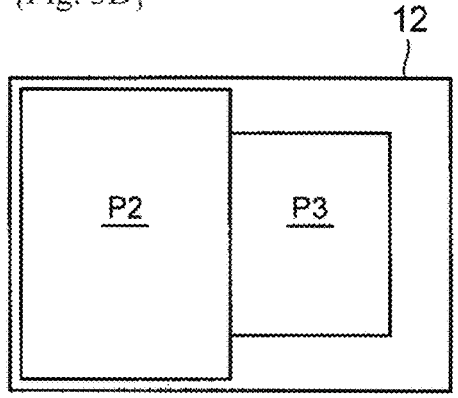
{Fig. 3E}
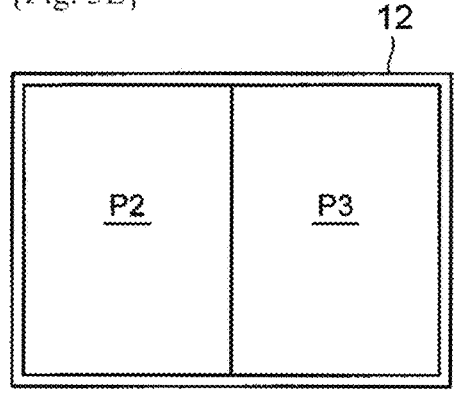

{Fig. 4A}
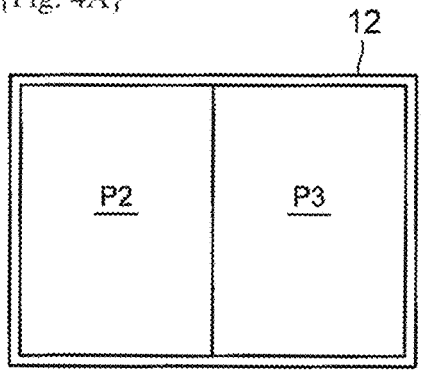
{Fig. 4B}
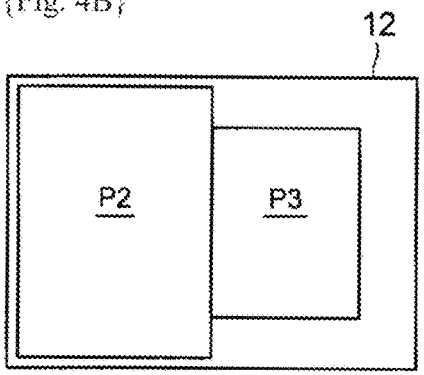
{Fig. 4C}
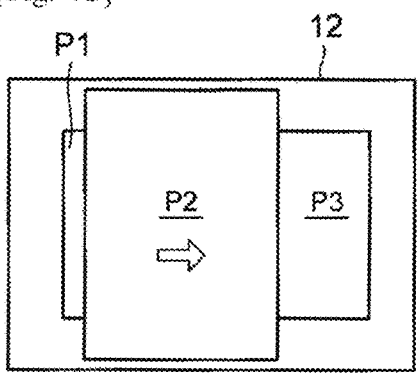
{Fig. 4D}
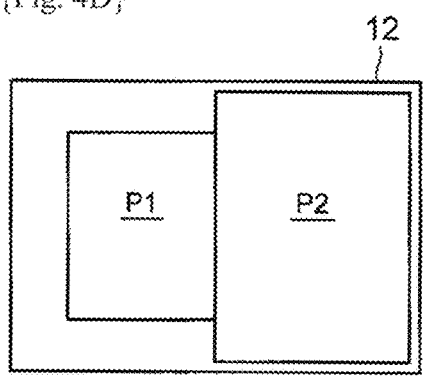
{Fig. 4E}
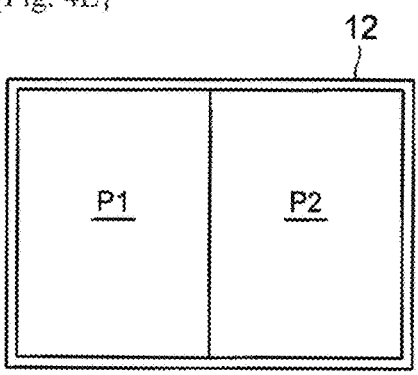

{Fig. 5}
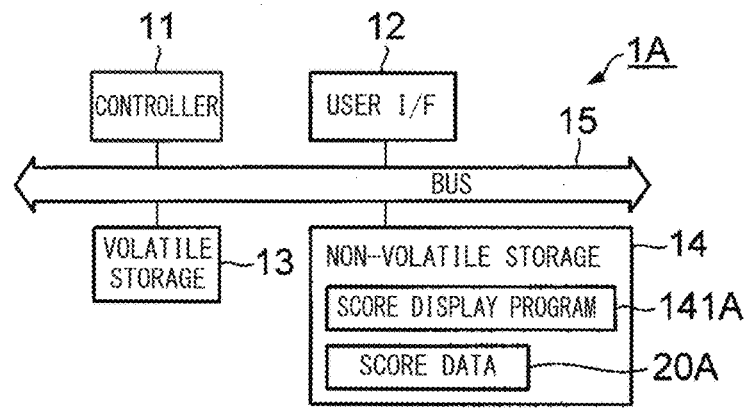
{Fig. 6}

{Fig. 7}
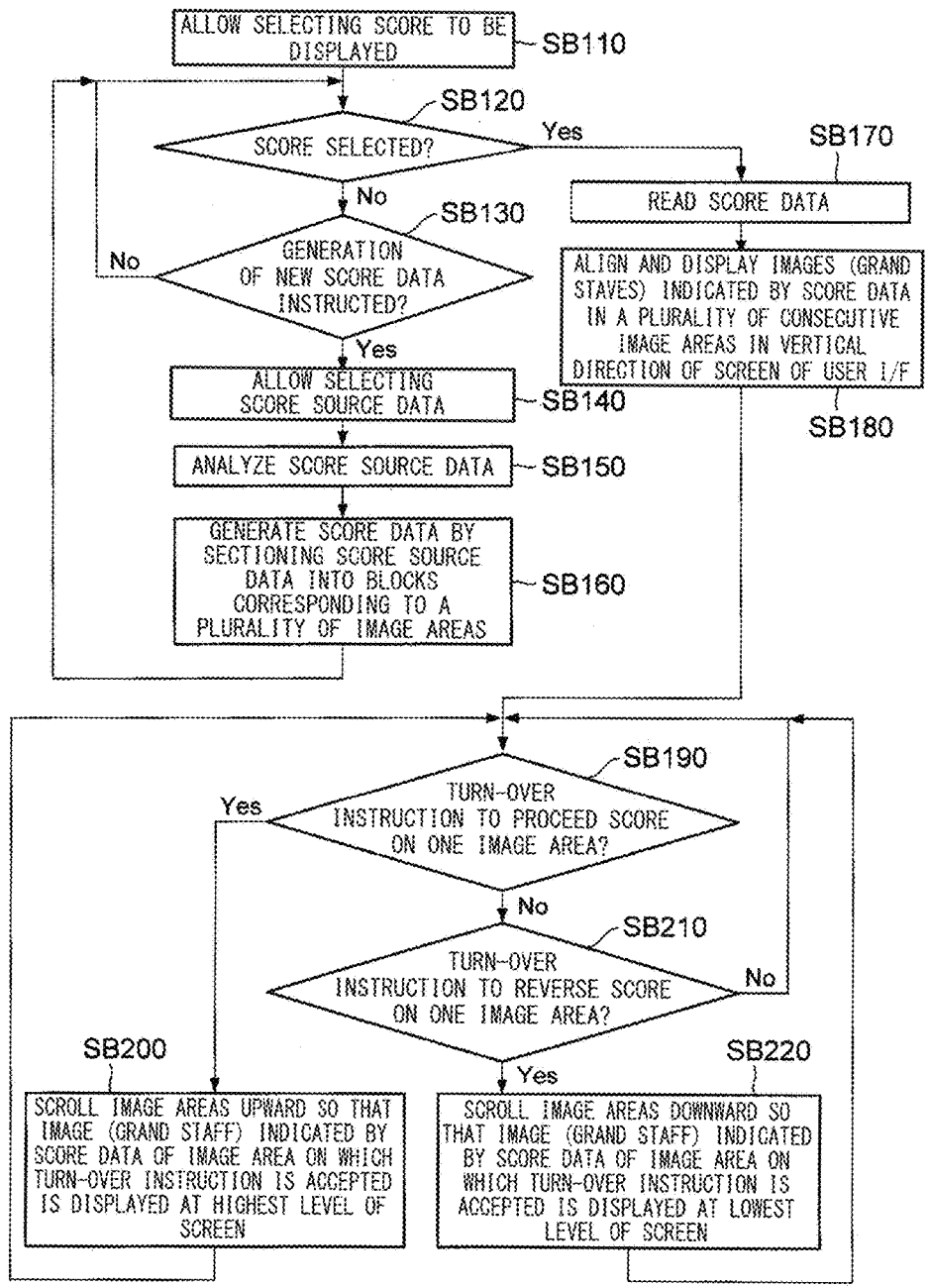

{Fig. 8}
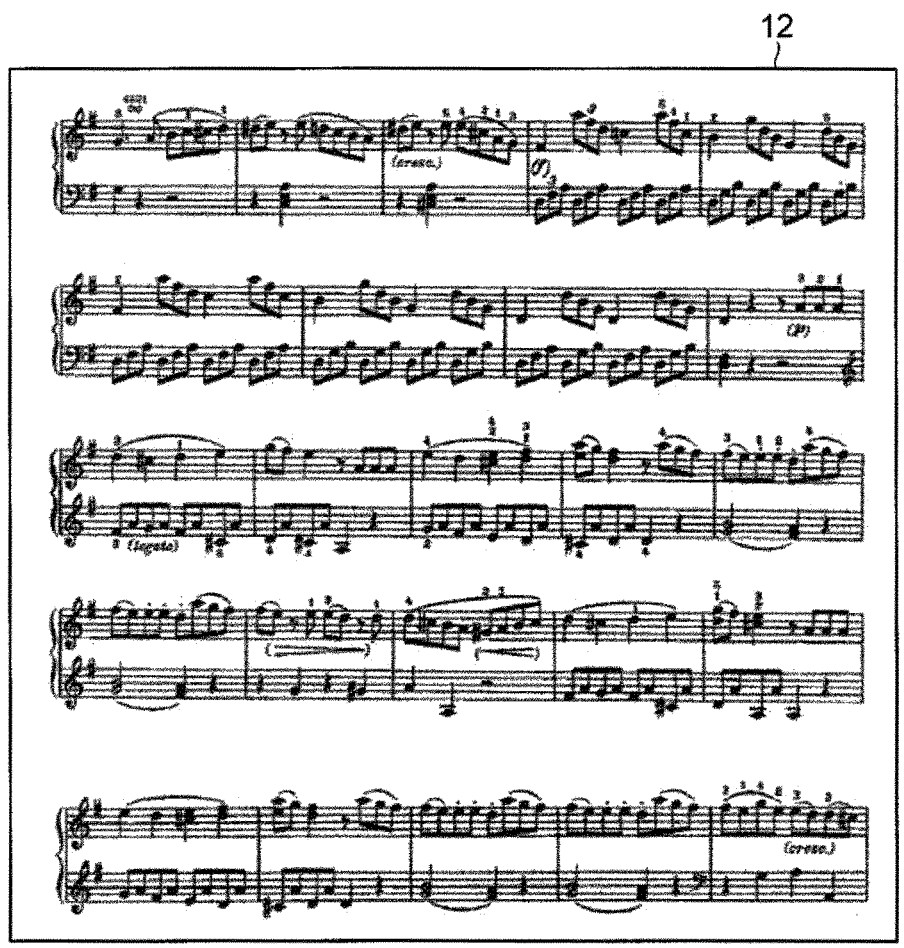

{Fig. 9A}
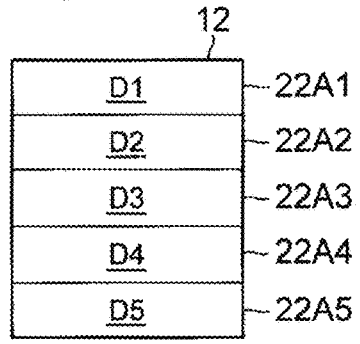
{Fig. 9B}
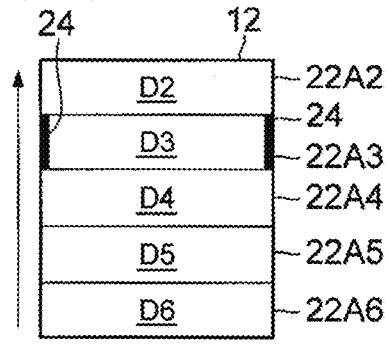
{Fig. 9C}
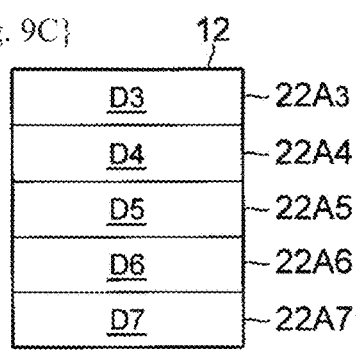
{Fig. 10A}
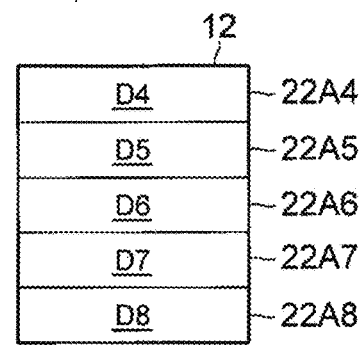
{Fig. 10B}
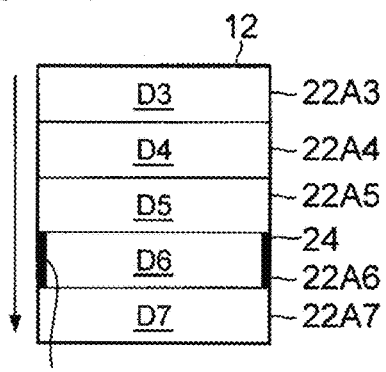
{Fig. 10C}
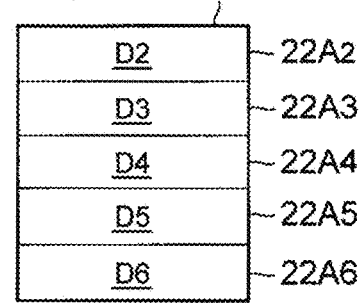

{Fig. 11}
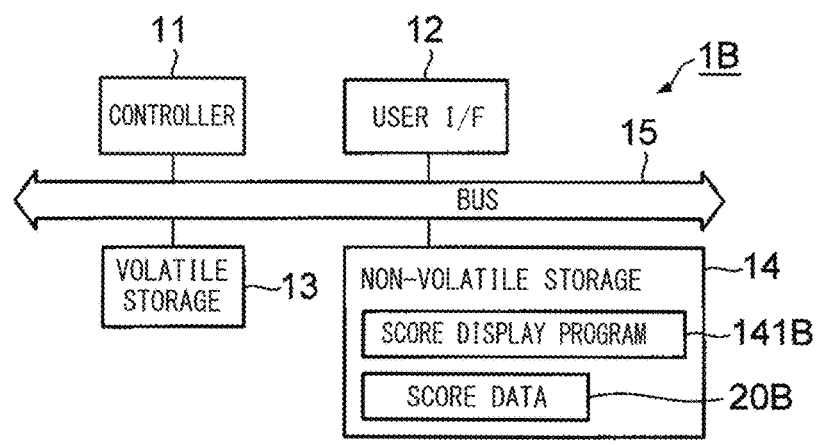
{Fig. 12}
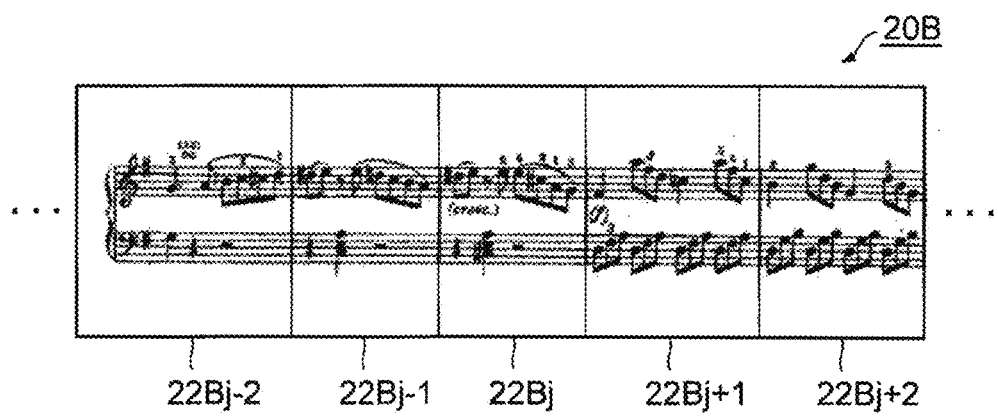

{Fig. 13}
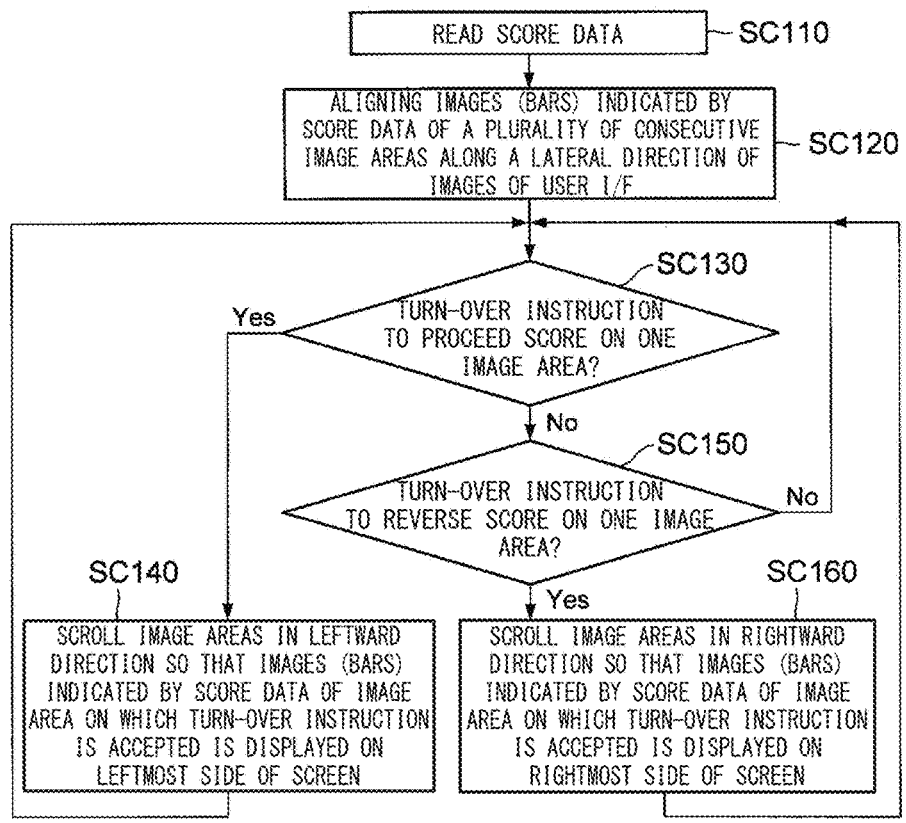

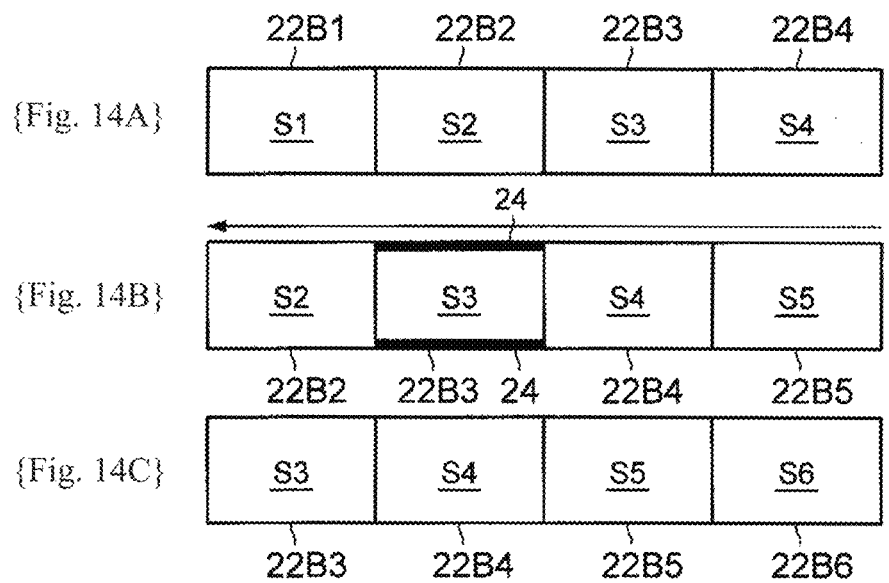
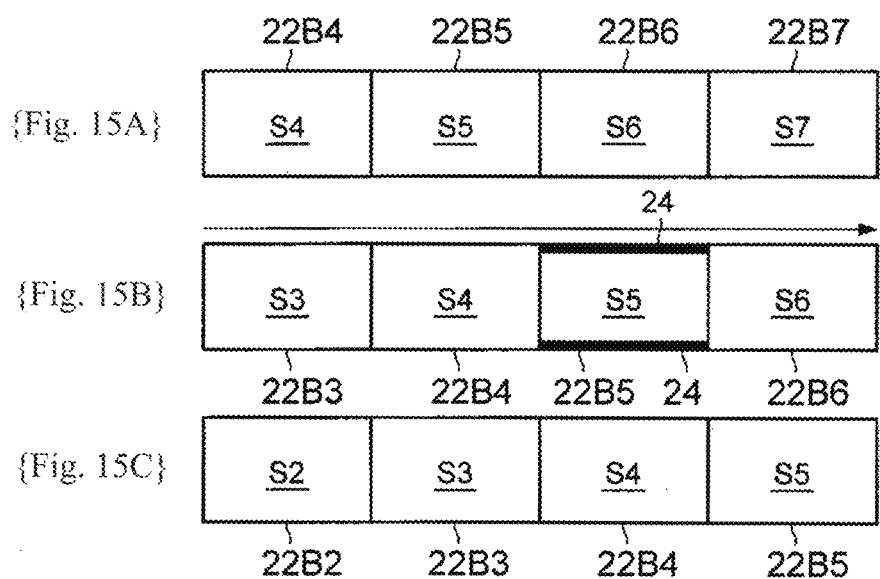

{Fig. 16}
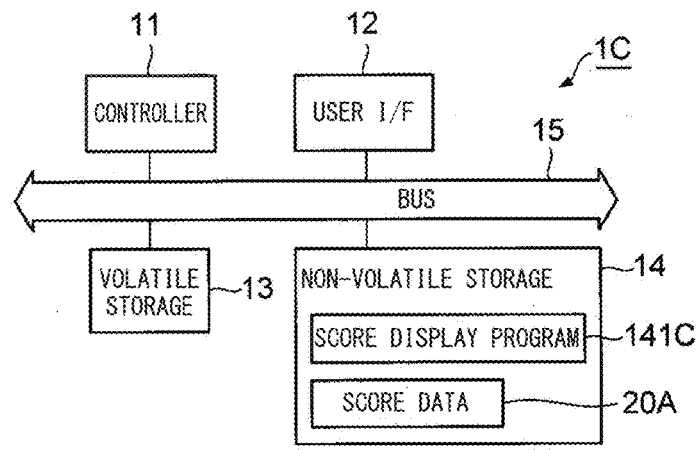
{Fig. 17}
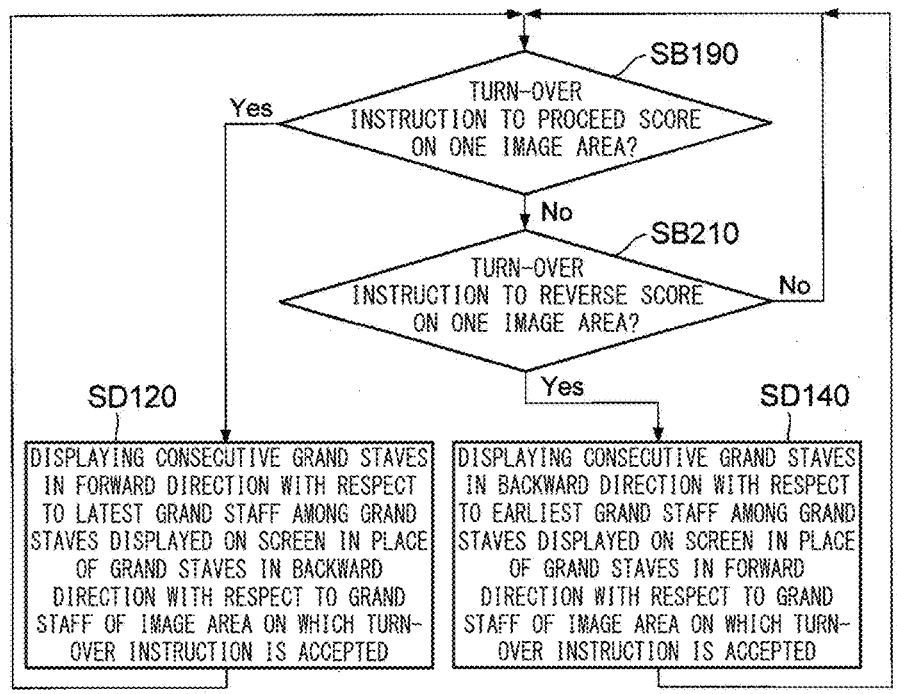

{Fig. 18A}

| D1 | — 22A1 |
|---|---|
| D2 | — 22A2 |
| D3 | — 22A3 |
| D4 | — 22A4 |
| D5 | — 22A5 |
| D6 | — 22A6 |

| D7 | — 22A7 |
|---|---|
| D8 | — 22A8 |
| D9 | — 22A9 |
| D10 | — 22A10 |
| D5 | — 22A5 |
| D6 | — 22A6 |

| D13 | — 22A13 |
|---|---|
| D14 | — 22A14 |
| D9 | — 22A9 |
| D10 | — 22A10 |
| D11 | — 22A11 |
| D12 | — 22A12 |

| D13 | — 22A13 |
|---|---|
| D14 | — 22A14 |
| D9 | — 22A9 |
| D10 | — 22A10 |
| D11 | — 22A11 |
| D12 | — 22A12 |

| D7 | — 22A7 |
|---|---|
| D8 | — 22A8 |
| D9 | — 22A9 |
| D10 | — 22A10 |
| D5 | — 22A5 |
| D6 | — 22A6 |

| D1 | — 22A1 |
|---|---|
| D2 | — 22A2 |
| D3 | — 22A3 |
| D4 | — 22A4 |
| D5 | — 22A5 |
| D6 | — 22A6 |

12

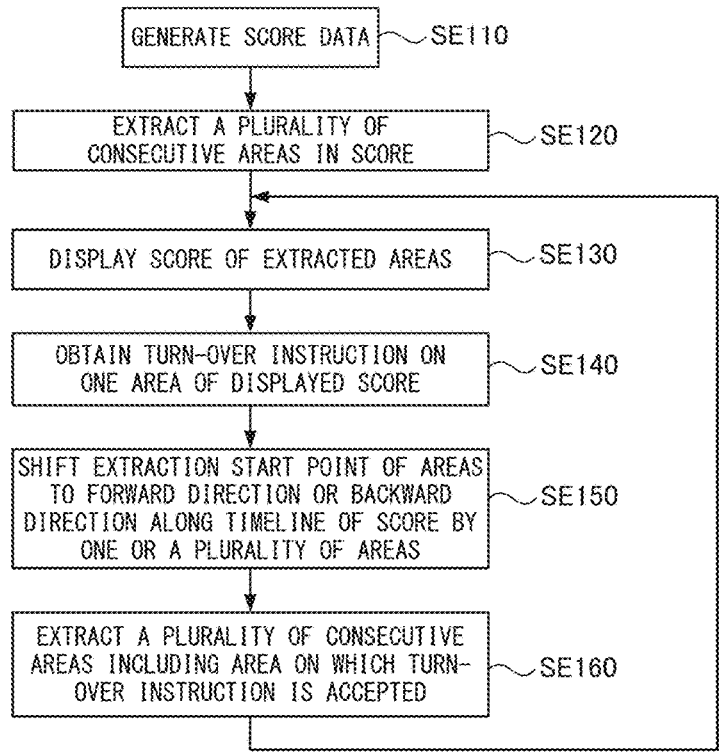
{Fig. 20}
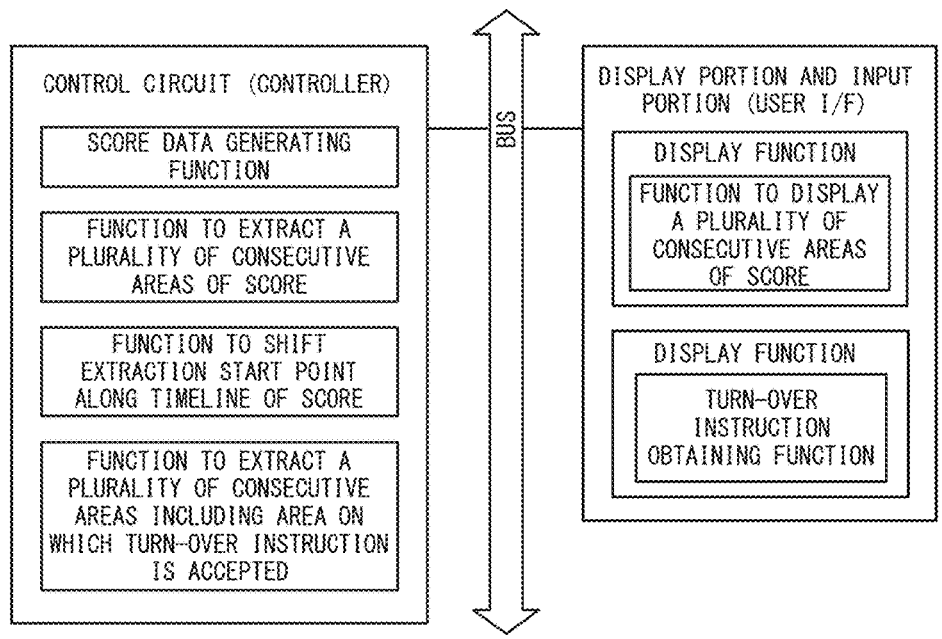
{Fig. 21}

{Fig. 22}
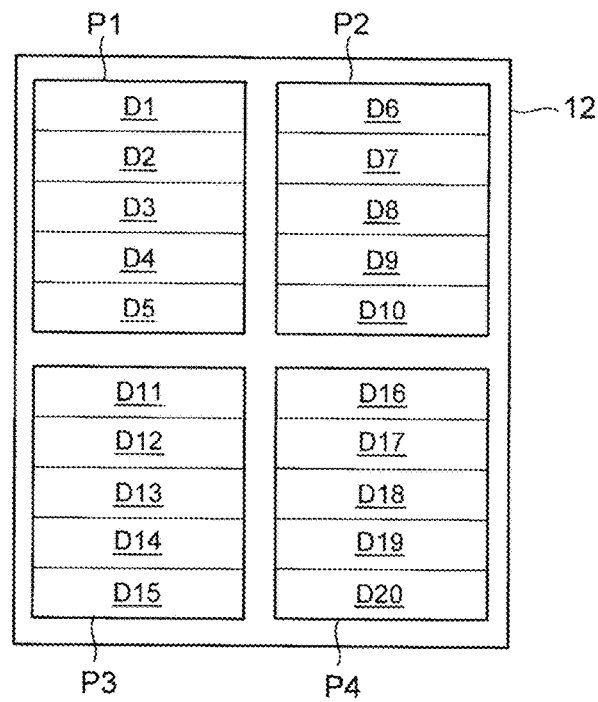
{Fig. 23}
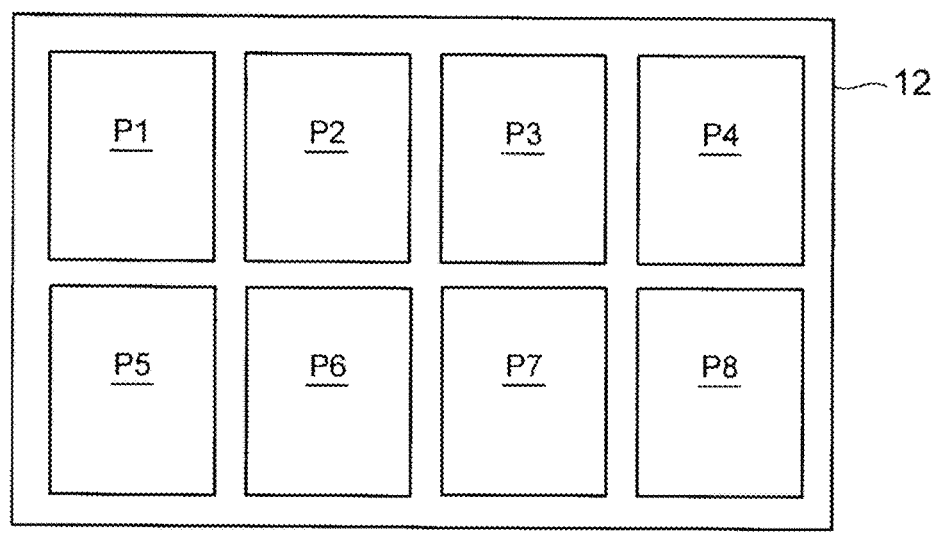

{Fig. 24}
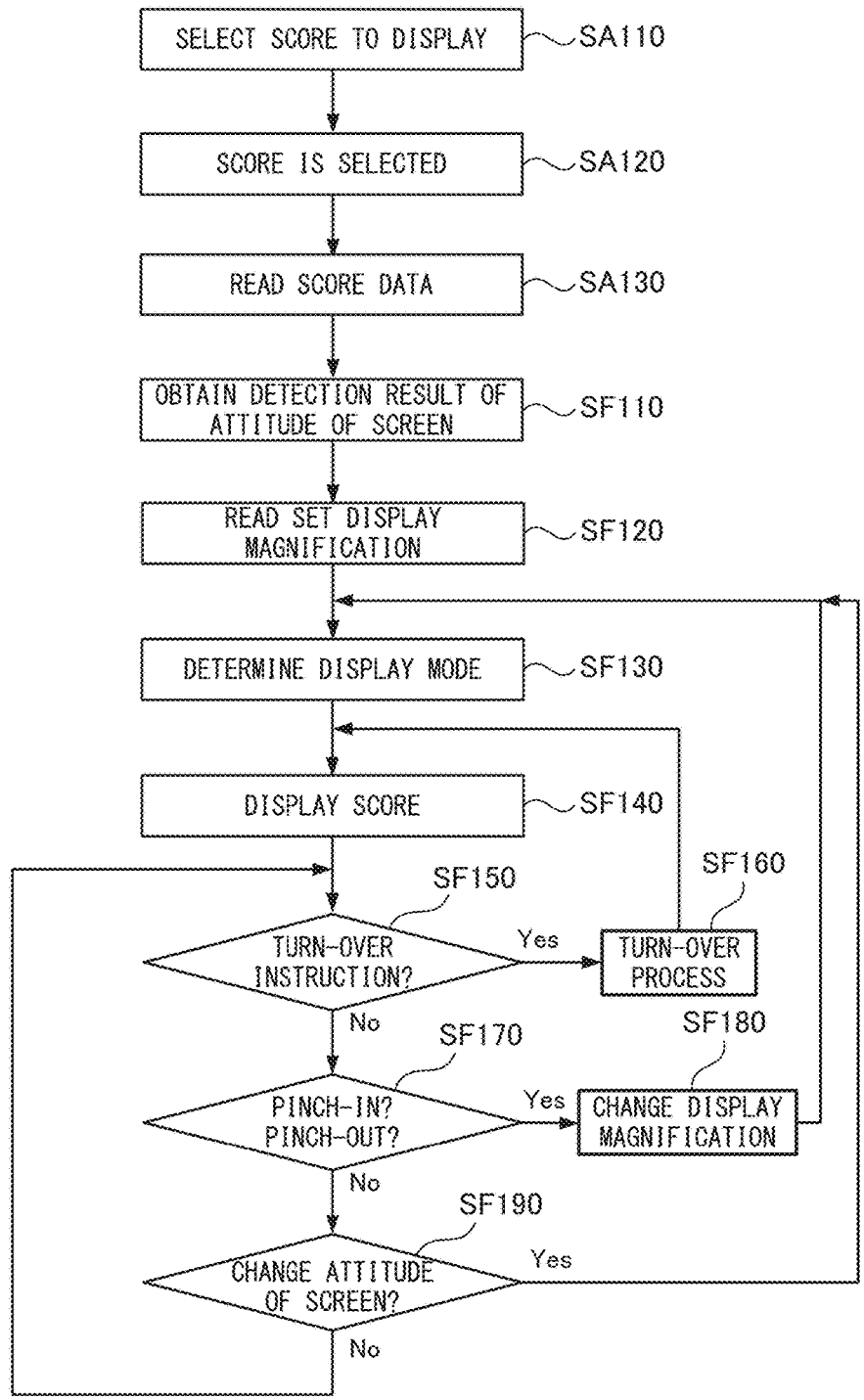

{Fig. 25}
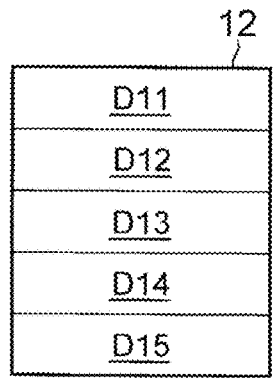
{Fig. 26}
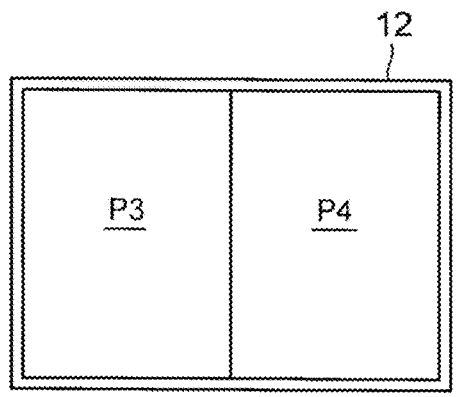
{Fig. 27}
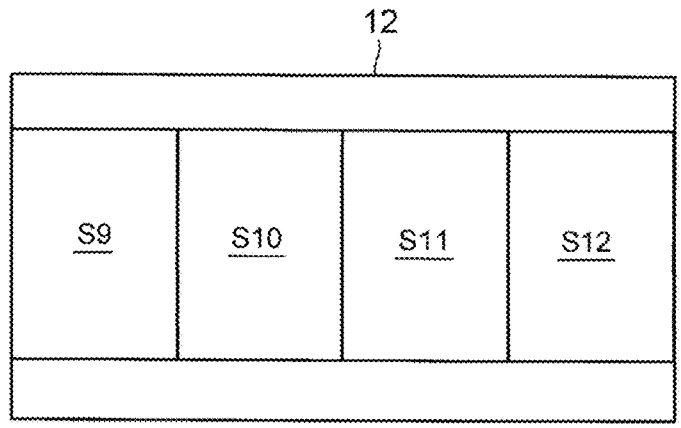

{Fig. 28A}
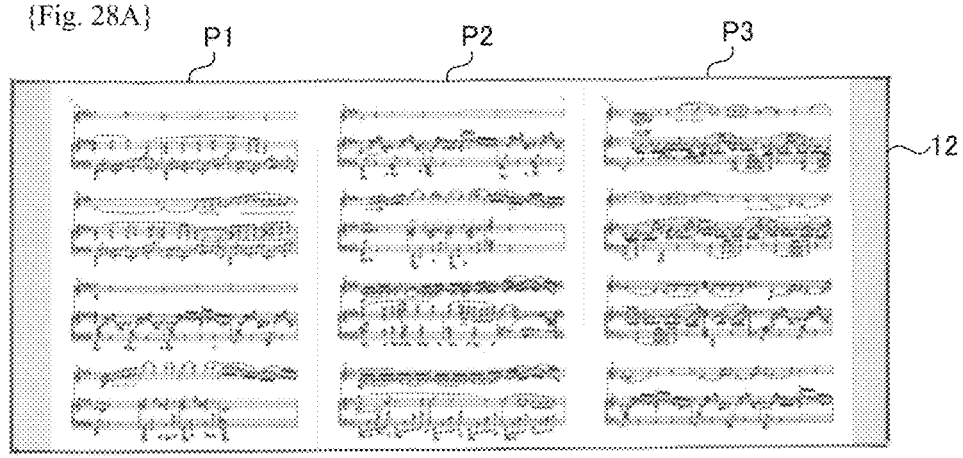
{Fig. 28B}
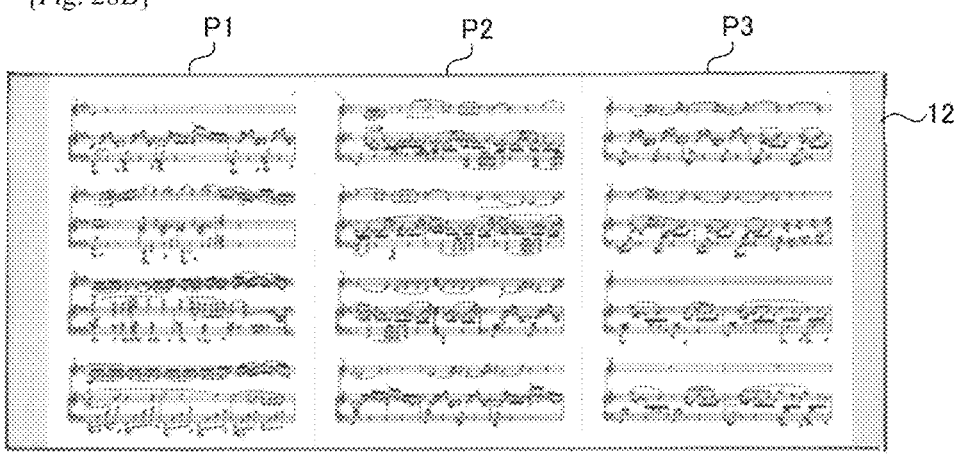
{Fig. 29}
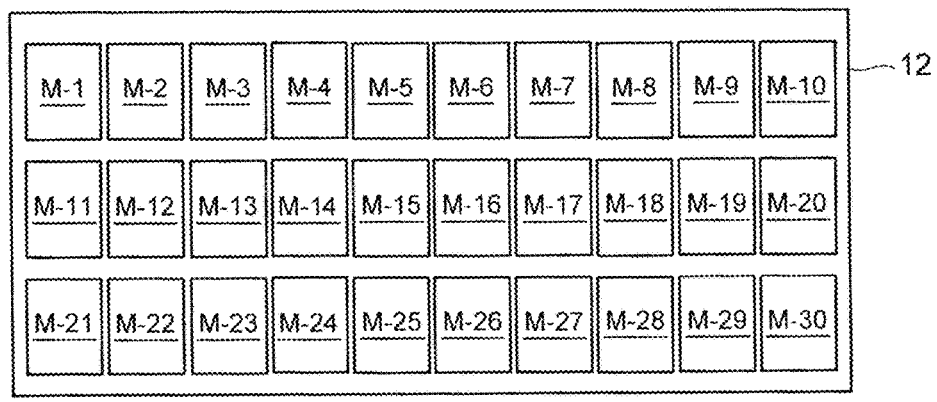

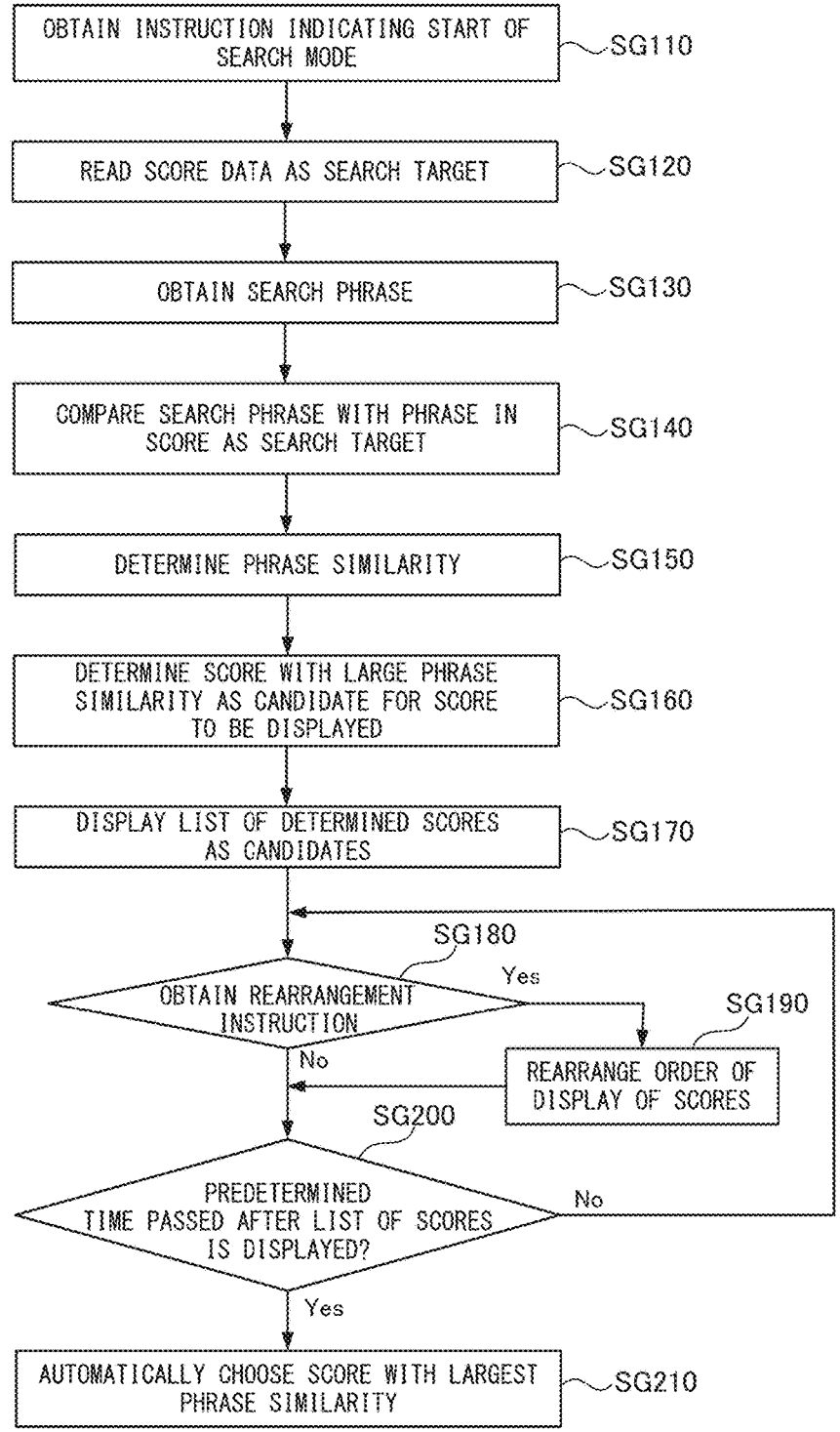
{Fig. 30}

{Fig. 31}
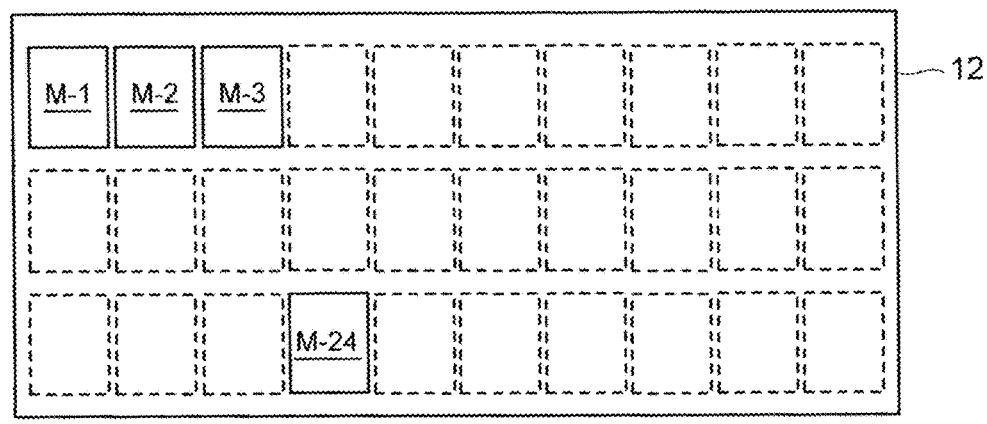
{Fig. 32}
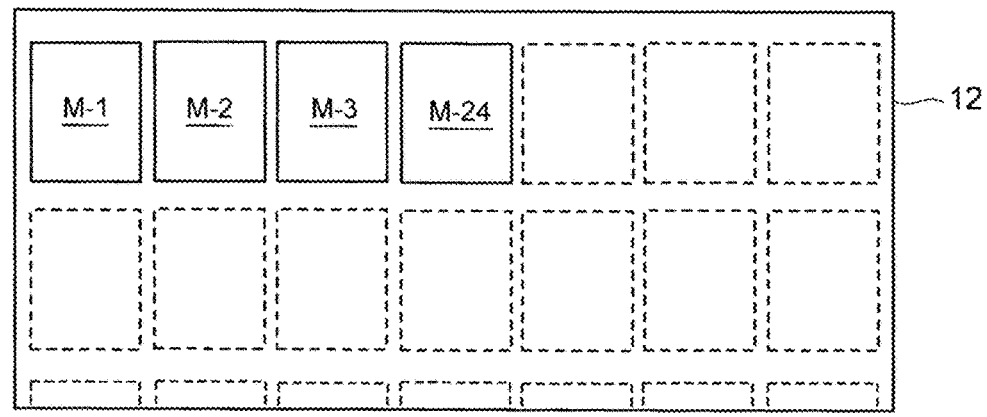

SCORE DISPLAYING METHOD AND STORAGE MEDIUM

TECHNICAL FIELD

The invention relates to a score displaying method for displaying an electronic score and a non-transitory machine-readable storage medium containing program instructions for enabling a computer to perform such a score displaying method.

BACKGROUND ART

There is a score displaying apparatus which displays an electronic score (hereinafter simply referred to as a score) on a screen of a display device (see, for example, PTL1). This kind of score displaying apparatus displays, for example, a score of two spread pages of a bound score on the screen. When contents of a score are more than two pages, the score displaying apparatus performs a turn-over process of switching the contents of the score to be displayed on the screen in response to an instruction from the user, or the like. Specifically, similarly to turning over a page of a bound score, the score displaying apparatus displays a score of next two spread pages on the screen in place of the displayed score of two spread pages.

Among display styles of score in the score displaying apparatus, there is a display style displaying a score of one page on the screen. In some cases, the score displaying apparatus of this style performs, for example, a turn-over process as follows in response to an instruction from a user, or the like. Once obtained an instruction from the user, the score displaying apparatus deletes the score of an upper half of the displayed page as if tearing it off while displaying the score of a lower half of the displayed page on the screen. Then, in place of the score of the upper half deleted from the screen, the score displaying apparatus displays on an upper half of the screen the score of an upper half of the next page of the displayed page.

CITATION LIST

Patent Literature

{PTL1} JP 2001-265327 A

SUMMARY OF INVENTION

Technical Problem

However, in the mode of performing the turn-over process in every two spread pages, in some cases, it is difficult for the user to perform a turn-over operation while performing music depending on the contents of the score. For example, when there is a difficult phrase or busy phrase in a bottom right portion of the displayed two pages, the user cannot release his or her hand from the instrument due to playing this phrase, and is unable to perform the turn-over operation until the performance of the displayed score of two pages finishes. Then, being unable to perform the turn-over operation, the user may stop the performance because he or she cannot grasp the contents of the score on the next page.

On the other hand, in the mode of displaying the score of one page and performing the turn-over process by every half page, even when there is a difficult phrase or a busy phrase in a bottom right portion of the displayed page, the user can perform the turn-over operation in advance before reaching this phrase so as to display the score of an upper half of the next page while leaving the phrase of the bottom right portion of the page displayed on the screen as it is. Since the contents of the score of the upper half of the next page can be grasped in advance, the user no longer stops performance. However, in this mode of performing the turn-over process in every half page, in some cases, a grand staff or the like may be cut into an upper and a lower part and displayed, in the vicinity of a center of the page. For example, when the user performs the turn-over operation on the score displaying five grand staves on one page, in the vicinity of the center of the screen there are only displayed a lower portion of a third grand staff on the page before the turn-over operation and an upper portion of a third grand staff on the next page. When the grand staff or the like is cut in middle and displayed in this manner, the result is quite hard to see. Further, since the grand staff or the like is cut in middle and displayed, the score displaying apparatus is unable to utilize the screen effectively. Thus, the conventional score displaying apparatus is not always convenient for turning-over pages of a score.

The present invention is made in view of the above-described situation, and it is an object thereof to provide technical means which improve convenience of an apparatus displaying an electronic score.

Solution to Problem

The present invention provides a score displaying method performed on an apparatus, the apparatus including a display and an input portion, the method including: extracting a plurality of consecutive areas starting from an extraction start point, from among a score being sectioned into areas based on a timeline of the score; displaying the plurality of areas of the score extracted by the extracting on the display; executing, in response to a turn-over instruction on one area among the plural areas of the score displayed on the display via the input portion, a process including: shifting the extraction start point by one or a plurality of areas to a forward direction or a backward direction along the timeline of the score; extracting a plurality of consecutive areas, including the one area on which the turn-over instruction is performed, starting from the shifted extraction start point; and displaying the extracted plurality of consecutive areas on the display.

According to the present invention, turning over is performed while the score inside the area on which the turn-over instruction is accepted is kept displayed on the display portion. Accordingly, stopping of performance related to a turn-over operation by the user can be avoided, or the risk of stopping performance can be decreased. Further, since the scores of a plurality of areas among the scores sectioned by every predetermined area (specifically, page, grand staff, bar, note, or the like) on the timeline of the score are displayed on the screen of the display, it will not happen that the contents of the score are cut in the vicinity of a center of the screen of the display (for example, a grand staff or the like is not cut into an upper and a lower part) and displayed. Further, since the turn-over instruction is performed on one area in the score displayed on the screen of the display, the user can change the turn-over range without changing an area to which the turn-over instruction is to be performed. Therefore, a highly convenient score displaying apparatus can be provided.

BRIEF DESCRIPTION OF DRAWINGS

FIG. 1 is a block diagram illustrating a configuration of a score displaying apparatus 1 according to a first embodiment of the present invention.

FIG. 2 is a flowchart illustrating a process executed by a controller 11 of the score displaying apparatus 1 according to a score display program 141.

FIG. 3A is a schematic diagram illustrating an example of screen transition by a turn-over process of proceeding a score in the score displaying apparatus 1, together with FIG. 3B to FIG. 3E.

FIG. 3B is a diagram subsequent to FIG. 3A.
FIG. 3C is a diagram subsequent to FIG. 3B.
FIG. 3D is a diagram subsequent to FIG. 3C.
FIG. 3E is a diagram subsequent to FIG. 3D.

FIG. 4A is a schematic diagram illustrating an example of screen transition by a turn-over process of reversing a score in the score displaying apparatus 1, together with FIG. 4B to FIG. 4E.

FIG. 4B is a diagram subsequent to FIG. 4A.
FIG. 4C is a diagram subsequent to FIG. 4B.
FIG. 4D is a diagram subsequent to FIG. 4C.
FIG. 4E is a diagram subsequent to FIG. 4D.

FIG. 5 is a block diagram illustrating a structure of a score displaying apparatus 1A according to a second embodiment of the present invention.

FIG. 6 is a conceptual diagram illustrating a structure of score data 20A of the score displaying apparatus 1A.

FIG. 7 is a flowchart illustrating a process executed by the controller 11 of the score displaying apparatus 1A according to a score display program 141A.

FIG. 8 is a view illustrating a display example of a score in the score displaying apparatus 1A.

FIG. 9A is a schematic diagram illustrating an example of screen transition by a turn-over process of proceeding a score in the score displaying apparatus 1A, together with FIG. 9B and FIG. 9C.

FIG. 9B is a diagram subsequent to FIG. 9A.
FIG. 9C is a diagram subsequent to FIG. 9B.

FIG. 10A is a schematic diagram illustrating an example of screen transition by a turn-over process of reversing a score in the score displaying apparatus 1A, together with FIG. 10B and FIG. 10C.

FIG. 10B is a diagram subsequent to FIG. 10A.
FIG. 10C is a diagram subsequent to FIG. 10B.

FIG. 11 is a block diagram illustrating a configuration of a score displaying apparatus 1B according to a third embodiment of the present invention.

FIG. 12 is a conceptual diagram illustrating a structure of score data 20B of the score displaying apparatus 1B.

FIG. 13 is a flowchart illustrating a process executed by a controller 11 of the score displaying apparatus 1B according to a score display program 141B.

FIG. 14A is a schematic diagram illustrating an example of screen transition by a turn-over process of proceeding a score in the score displaying apparatus 1B, together with FIG. 14B and FIG. 14C.

FIG. 14B is a diagram subsequent to FIG. 14A.
FIG. 14C is a diagram subsequent to FIG. 14B.

FIG. 15A is a schematic diagram illustrating an example of screen transition by a turn-over process of reversing a score in the score displaying apparatus 1A, together with FIG. 15B and FIG. 15C.

FIG. 15B is a diagram subsequent to FIG. 15A.
FIG. 15C is a diagram subsequent to FIG. 15B.

FIG. 16 is a block diagram illustrating a configuration of a score displaying apparatus 1C according to a fourth embodiment of the present invention.

FIG. 17 is a flowchart illustrating a process executed by a controller 11 of the score displaying apparatus 1C according to a score display program 141C after a score is displayed on the screen.

FIG. 18A is a schematic diagram illustrating an example of screen transition by a turn-over process of proceeding a score in the score displaying apparatus 1C, together with FIG. 18B and FIG. 18C.

FIG. 18B is a diagram subsequent to FIG. 18A.
FIG. 18C is a diagram subsequent to FIG. 18B.

FIG. 19A is a schematic diagram illustrating an example of screen transition by a turn-over process of reversing a score in the score displaying apparatus 1C, together with FIG. 19B and FIG. 19C.

FIG. 19B is a diagram subsequent to FIG. 19A.
FIG. 19C is a diagram subsequent to FIG. 19B.

FIG. 20 is a flowchart illustrating a process performed by a controller of a score displaying apparatus of a fifth embodiment of the present invention.

FIG. 21 is a diagram illustrating functions of respective components of the score displaying apparatus.

FIG. 22 is a schematic view illustrating an example of a screen when a controller 11 of a score displaying apparatus 1F according to a sixth embodiment of the present invention displays scores in a 4-up display mode on the screen retained in a vertically long attitude.

FIG. 23 is a schematic view illustrating an example of a screen when the controller 11 of the score displaying apparatus 1F displays scores in an 8-up display mode on the screen retained in a laterally long attitude.

FIG. 24 is a flowchart illustrating a process performed by the controller 11 of the score displaying apparatus 1F.

FIG. 25 is a schematic diagram illustrating an example of a screen when the controller 11 of the score displaying apparatus 1F displays the score in a grand staff display mode on the screen.

FIG. 26 is a schematic diagram illustrating an example of a screen when the controller 11 of the score displaying apparatus 1F displays the score in a page display mode on the screen.

FIG. 27 is a schematic diagram illustrating an example of a screen when the controller 11 of the score displaying apparatus 1F displays the score in a bar display mode on the screen.

FIG. 28A is a schematic view illustrating an example of a screen when a controller 11 of a score displaying apparatus of a modification example (9) of the present invention displays a plurality of pages more than two in the page display mode on the screen.

FIG. 28B is a schematic view illustrating another example of the same.

FIG. 29 is a schematic view illustrating an example of a screen when a controller 11 of a score displaying apparatus of a modification example (16) of the present invention displays a list of displayable scores on the screen.

FIG. 30 is a flowchart illustrating a process performed by the controller 11 of a score displaying apparatus of the modification example (16).

FIG. 31 is a schematic diagram illustrating an example of a screen when the controller 11 of the score displaying apparatus of the modification example (16) displays a list of scores determined as candidates of a score to be displayed on the screen.

FIG. 32 is a schematic diagram illustrating an example of a screen when the controller 11 of the score displaying apparatus of the modification example (16) rearranges scores determined as candidates and displays a list of the scores on the screen.

DESCRIPTION OF EMBODIMENTS

Hereinafter, embodiments of the present invention will be described with reference to the drawings.

<First Embodiment>

FIG. 1 is a block diagram illustrating a configuration of a score displaying apparatus 1 according to a first embodiment of the present invention. The score displaying apparatus 1 has a controller 11, a user interface (hereinafter referred to as a user I/F) 12, a volatile storage 13, a non-volatile storage 14, and a bus 15 which mediates data transmission and reception among these components.

The user I/F 12 is a touch panel for example. The user I/F 12 has a display function to display information indicated by various data or the like on a screen, and an input function to accept an operation such as a touch by a user and give data representing the operation to the controller 11. Note that data representing the operation is data indicating a tap position when it is a tap operation, or data indicating a flick direction and a flick amount when it is a flick operation. That is, the user I/F 12 combines the role of a display and the role of an input portion.

The controller 11 is a CPU (Central Processing Unit) for example. The controller 11 is a control center controlling the units of the score displaying apparatus 1 by executing a program stored in the non-volatile storage 14.

The volatile storage 13 is a RAM (Random Access Memory) for example. The volatile storage 13 is used as a work area by the controller 11. The non-volatile storage 14 is, for example, a flash memory or a hard disk drive, and is a storage device for storing information of various programs and the like. The non-volatile storage 14 stores a score display program 141 and score data 20 which are peculiar to this embodiment.

The score display program 141 is a main program of the score displaying apparatus 1. The controller 11 executes the score display program 141 to thereby enable a computer such as a tablet terminal to function as the score displaying apparatus 1. The score data 20 is image data of a score to be displayed on the screen of the user I/F 12. The score data 20 in this embodiment is image data of, for example, a score of a PDF (Portable Document Format) file or the like. The score data 20 may be obtained via a network or may be obtained by reading from a paper medium via a scanner or the like. The controller 11 performs a process of displaying a score indicated by the score data 20 on the screen of the user I/F 12 according to the score display program 141. The process executed by the controller 11 according to the score display program 141 will be described in detail in a description of operation. Further, the score data 20 is sectioned by every predetermined area on a timeline of the score indicated by the score data 20. Specifically, this score data 20 is a set of data in which a display target score is sectioned into a plurality of consecutive predetermined areas along a timeline of the score. In this specification, the timeline of the score is an axis in a beating direction of notes, is an axis in a direction of time flow of a melody, and refers to an axis in a direction along each horizontal line in the grand staff. Further, specific examples of the predetermined area include a page, a grand staff, a bar, a note (the note includes a rest in this specification), and the like. The score data 20 of this embodiment includes page information for identifying each page in the score indicated by the score data 20, and is sectioned by every page by the page information. In other words, the score indicated by the score data 20 is sectioned into pages. Further, a score image obtained by rendering a music XML (file format for score notation in the XML (eXtensible Markup Language) format) file may be used as the score data 20, or a score image obtained by rendering a score file created by notation software (software for editing a score to an easily readable score) may be used as the score data 20. This is because they can also be sectioned into pages.

This concludes the configuration of the score displaying apparatus 1.

Next, operation of the score displaying apparatus 1 and a mode of use by a user will be described.

The controller 11 of the score displaying apparatus 1 starts execution of a score display program 141 in response to an instruction from the user. For example, the controller 11 starts execution of the score display program 141 in response to a tap on an icon indicating the score display program 141 on the screen of the user I/F 12. FIG. 2 is a flowchart illustrating a process executed by the controller 11 according to the score display program 141. First, the controller 11 allows the user to select a score to be displayed on the screen of the user I/F 12 (SA110). Specifically, the controller 11 displays on the screen a list of the score data 20 stored in the non-volatile storage 14 as a list of displayable scores. The user taps an image indicating one score in the list of displayable scores which is displayed on the screen of the user I/F 12, so as to select a score to be displayed on the screen of the user I/F 12. Once the score is selected (SA120), the controller 11 reads score data 20 corresponding to the selected score from the non-volatile storage 14 (SA130). Next, the controller 11 performs a process of displaying a score of a plurality of areas in the score indicated by the read score data 20, specifically, a score of two consecutive pages on the screen of the user I/F 12 (SA140). More specifically, the controller 11 performs a process including: displaying a score of an earlier page (for example, the first page) of the two consecutive pages in a position of a left half when facing toward the screen of the user I/F 12 (hereinafter referred to as a left half of the screen); and displaying a score of a later page (for example, the second page) of the two consecutive pages in a position of a right half when facing toward the screen of the user I/F 12 (hereinafter referred to as a right half of the screen).

Next, turning over of a score will be described. The controller 11 performs a turn-over process depending on whether or not a turn-over instruction on one area in a score displayed on the screen of the user I/F 12 is given via the user I/F 12. Describing more specifically, first, the controller 11 judges whether or not information indicating an input operation by the user is obtained from the user I/F 12 (not illustrated). The controller 11 repeats the judgment of whether or not the information indicating an input operation is obtained, until the information indicating an input operation by the user is obtained. When the information indicating an input operation is obtained, the controller 11 analyses the information indicating the input operation. Specifically, the controller 11 judges whether or not the obtained information indicating the input operation is a turn-over instruction on the later page out of the displayed score of two pages (SA150). Describing further specifically, when the obtained information indicating the input operation is information indicating a flick operation in a leftward direction (that is, the earlier page direction) by the user on the screen of the user I/F 12, the controller 11 judges that it is a turn-over instruction on the later page. When the obtained information indicating the input operation is the turn-over instruction on the later page (Yes in SA150), the controller 11 performs processes of steps SA160 to SA180 which are the turn-over process of proceeding the score.

The turn-over process of proceeding the score will be described using specific examples. FIGS. 3A to 3E are schematic diagrams illustrating an example of screen transition by the turn-over process of proceeding the score. In this embodiment, contents displayed on the screen of the user I/F 12 according to the turn-over process change in the order of FIG. 3A to FIG. 3E. FIG. 3A illustrates a state that a score of the first page (P1 in the figures) is displayed on a left half of the screen, and a score of the second page (P2 in the figures) is displayed on a right half of the screen. In this state, it is assumed that the controller 11 obtains a turn-over instruction on the later page out of the displayed score of two pages, that is, a turn-over instruction on the second page in FIG. 3A. The controller 11 which obtained this instruction performs a process of reduction-displaying the score of the earlier page out of the displayed score of two pages, that is, the score of the first page displayed on the left half of the screen (FIG. 2: SA160, FIG. 3B). At this time, the controller 11 produces an animation such that the score of the earlier page (first page) is gradually reduced. Thus, it is possible to provide the user with a feeling that the score of the later page (second page) floats up on a relatively near side of the screen with respect to the score of the earlier page (first page).

Next, the controller 11 performs a process of, while displaying the score of the later page (second page in this operation example) as a target of turning over on the foreground of the screen of the user I/F 12, moving the score of the second page to a position where the earlier page (first page) has been displayed, that is, a position on the left side of a center of the screen (FIG. 2: SA170, FIG. 3C to FIG. 3D). At this time, as illustrated in FIG. 3C, the controller 11 produces an animation such that the score of the second page gradually moves. Since the score of the second page is displayed on the foreground in this step S170, the score of the first page hides behind the score of the second page. Then, the controller 11 performs a process of moving the score of the second page in this step SA170, and performs a process of displaying a reduced score of a page which is one page later than the second page, that is, the third page (P3 in the figures). In the display process of the third page, the controller 11 performs a process such that the reduced score of the third page is disposed in an area where the score of the second page has been displayed (that is, the right half of the screen) and on a rear side of the score of the second page, and the reduced score of the third page appears gradually on the screen accompanying the movement of the score of the second page.

Next, the controller 11 performs a process of enlarge-displaying the score of the page of the one page later (third page), which is reduction-displayed in the area of the later page as the turn-over target before moving, to a normal size (FIG. 2: SA180, FIG. 3E). At this time, the controller 11 produces an animation such that the score of the page of the one page later (third page) gradually enlarges. Thus, it is possible to provide the user with a feeling that the score of the later page (second page) as the turning-over target relatively sinks toward the depth of the screen relative to the score of the page of the one page later (third page). Thus, the display state of the user I/F 12 changes from the state that the score of the first page and the score of the second page are displayed to a state that the score of the second page and the score of the third page are displayed. In this turning over to proceed the score, it is possible to provide the user with a feeling that the score of the page stacking on the right half of the screen (later page) out of the score of two pages displayed on the screen of the user I/F 12 is stacked on the score of the page displayed on the left half of the screen (earlier page). After step SA180, the controller 11 returns to the process of judging whether or not the information indicating an input operation is obtained from the user I/F 12, and when the information indicating the input operation is obtained again, the processes of step SA150 and so on are performed.

On the other hand, when the obtained information indicating an input operation is not the turn-over instruction on the later page (No in SA150), the controller 11 judges whether or not the obtained information indicating an input operation is a turn-over instruction on the earlier page out of the displayed score of two pages (SA190). Describing further specifically, when the obtained information indicating the input operation is information indicating a flick operation in a rightward direction (that is, the later page direction) by the user on the screen of the user I/F 12, the controller 11 judges that it is a turn-over instruction on the earlier page. When the obtained information indicating the input operation is the turn-over instruction on the earlier page (Yes in SA190), the controller 11 performs processes of steps SA200 to SA220 which are a turn-over process of reversing the score. When the information indicating the obtained input operation is not the turn-over instruction on the earlier page (No in SA190), the controller 11 judges whether or not the obtained information indicating the input operation is an end instruction of the score display program 141 (not illustrated). When it is the end instruction of the score display program 141, the controller 11 ends the score display program 141, or when it is not the end instruction of the score display program 141, the controller 11 returns to the process of judging whether or not the information indicating an input operation by the user is obtained from the user I/F 12 and the process of analyzing the information indicating the input operation (SA150).

The turn-over process of reversing the score will be described using specific examples. FIGS. 4A to 4E are schematic diagrams illustrating an example of screen transition by the turn-over process of reversing the score. In FIGS. 4A to 4E, contents displayed on the screen of the user I/F 12 according to the turn-over process change in the order of FIG. 4A to FIG. 4E. FIG. 4A illustrates a state that a score of the second page (P2 in the figures) is displayed on a left half of the screen, and a score of the third page (P3 in the figures) is displayed on a right half of the screen. In this state, it is assumed that the controller 11 obtains a turn-over instruction on the earlier page out of the displayed score of two pages, that is, a turn-over instruction on the second page. The controller 11 which obtained this instruction performs a process of reduction-displaying the score of the later page out of the displayed score of two pages, that is, the score of the third page displayed on the right half of the screen (FIG. 2: SA200, FIG. 4B). At this time, the controller 11 produces an animation such that the score of the later page (third page) is gradually reduced. Thus, it is possible to provide the user with a feeling that the score of the earlier page (second page) floats up on a relatively near side of the screen with respect to the score of the later page (third page).

Next, the controller 11 performs a process of, while displaying the score of the earlier page (second page in this operation example) as a target of turning over on the foreground of the screen of the user I/F 12, moving the score of the second page to a position where the score of the later page (third page) has been displayed, that is, a position on the right side of a center of the screen (FIG. 2: SA210, FIG. 4C and FIG. 4D). At this time, as illustrated in FIG. 4C, the controller 11 produces an animation such that the score of the second page gradually moves. Since the score of the second page is displayed on the foreground in this step S210, the score of the third page hides behind the score of the second page. Then, the controller 11 performs a process of moving the score of the second page in this step SA210, and performs a process of displaying a reduced score of a page which is one page earlier than the second page, that is, the first page (P1 in the figures). In the display process of the first page, the controller 11 performs a process such that the reduced score of the first page is disposed in an area where the score of the second page has been displayed (that is, the left half of the screen) and on a rear side of the score of the second page, and the reduced score of the first page appears gradually on the screen accompanying the movement of the score of the second page.

Next, the controller 11 performs a process of enlarge-displaying the score of the page of the one page earlier (first page), which is reduction-displayed in the area of the earlier page as the turn-over target before moving, to a normal size (FIG. 2: SA220, FIG. 4E). At this time, the controller 11 produces an animation such that the score of the page of the one page earlier (first page) gradually enlarges. Thus, it is possible to provide the user with a feeling that the score of the earlier page (second page) as the turning-over target relatively sinks toward the depth of the screen relative to the score of the page of the one page earlier (first page). Thus, the display state of the user I/F 12 changes from the state that the score of the second page and the score of the third page are displayed to a state that the score of the first page and the score of the second page are displayed. In this turning over to reverse the score, it is possible to provide the user with a feeling that the score of the page stacking on the left half of the screen (earlier page) out of the score of two pages displayed on the screen of the user I/F 12 is stacked on the score of the page displayed on the right half of the screen (later page). After step SA220, the controller 11 returns to the process of judging whether or not the information indicating an input operation by the user is obtained from the user I/F 12 and the process of analyzing the information indicating the input operation (SA150).

In this manner, the controller 11 of the score displaying apparatus 1 of this embodiment performs, in response to that a turn-over instruction (specifically, information indicating a flick operation in the leftward direction or the rightward direction by the user on the screen of the user I/F 12) on one page out of the score of two pages displayed on the screen of the user I/F 12 is obtained via the user I/F 12, a process of displaying the score of the one page on the screen such that the score moves and be stacked on the score of the other page, and further displaying, accompanying the movement of the score of the one page, the score of the page which is one page later than the one page or the score of the page which is one page earlier than the one page in a position where the score of the one page was displayed before the score of the one page moves. That is, in response to that a turn-over instruction on one area in the score displayed on the screen of the user I/F 12 is obtained via the user I/F 12, the controller 11 of the score displaying apparatus 1 according to this embodiment performs a process of displaying on the screen of the user I/F 12 a score in areas consecutive in a forward direction on the timeline of the score from the area on which the turn-over instruction is accepted with reference to the score in the area on which the turn-over instruction is accepted, or a score in areas consecutive in a backward direction on the timeline of the score from the area on which the turn-over instruction is accepted, while the score in the area on which the turn-over instruction is accepted is left displayed on the screen of the user I/F 12. Thus, the user can perform turning over in any moment that his or her hand performing music becomes free such as a rest part. For example, at a rest before reaching a difficult phrase or a busy phrase, the user performs a turn-over operation in advance on an area to which the rest belongs. Since the turning over is performed while a difficult phrase or a busy phrase coming up after this rest is left displayed, the user can grasp contents of the score ahead of that while playing this difficult phrase or busy phrase. Thus, it is possible to avoid stopping performance because of the turn-over operation of the user, or reduce the risk of stopping the performance. Further, in the score displaying apparatus 1 according to this embodiment, since the turning over is performed by page, it will not happen that contents of the score are cut (for example, a grand staff is cut horizontally) and displayed. Therefore, a score displaying apparatus with high convenience in comparison with conventional score displaying apparatuses can be provided.

Further, in the score displaying apparatus 1 according to this embodiment, when the turn-over process is performed, the score of an earlier page is always displayed on the left half of the screen of the user I/F 12, and the score of a later page is always displayed likewise on the right half. Thus, also after the turning over, the user can move his or her line of sight from left to right or from top to bottom of the score similarly to before the turning over, and thus can give a performance without a sense of incompatibility. Further, in the score displaying apparatus 1 according to this embodiment, since the information indicated by a flick operation is used as the turn-over instruction, the user can perform the turn-over operation quickly.

Note that in this embodiment, when the turn-over process is performed, the process of reduction-displaying the score of the other page and the process of enlarging the score to be newly displayed by the turning over to a normal size are performed. These reduction-display process and enlarge-display process are processes performed for giving the user a strong sense of stacking the score of one page on the score of the other page, but are not essential processes in this embodiment. This is because it is possible to provide the user with the feeling of stacking the score of one page on the score of the other page by that, for example, the score of one later page than the one page is disposed in a normal size in a position of the score of the one page before moving and on a back side of the score of the one page, and the one later page than this one page appears accompanying movement of the score of the one page to a position in front of the score of the other page displayed in an ordinary size. Further, an animation is produced when reduction display, movement display and enlargement displace are performed, but it may be configured not to produce an animation when such display is performed.

<Second Embodiment>

The score displaying apparatus 1 according to the first embodiment is to perform turning over in unit of page. On the other hand, a score displaying apparatus 1A of a second embodiment of the present invention is to perform turning over in unit of grand staff. FIG. 5 is a block diagram illustrating a structure of the score displaying apparatus 1A according to this embodiment. As illustrated in FIG. 5, the score displaying apparatus 1A according to this embodiment is different from the score displaying apparatus 1 according to the first embodiment in that the score displaying apparatus 1A has a score display program 141A instead of the score display program 141, and score data 20A instead of the score data 20.

The score display program 141A is different from the score display program 141 according to the first embodiment in processes executed by the controller 11. The processes executed by the controller 11 according to the score display program 141A will be described in detail in a description of operation.

The score data 20A is similar to the score data 20 according to the first embodiment in that it is sectioned by every predetermined area on a timeline of a score indicated by the score data 20, but is different from the score data 20 according to the first embodiment in unit of section. Specifically, the score data 20A is divided into a plurality of blocks so that a score image is sectioned by every grand staff.

FIG. 6 is a conceptual diagram illustrating a structure of the score data 20A. In FIG. 6, the score data 20A is illustrated as a picture image. In the example of FIG. 6, a plurality of grand staves are arranged in a vertical direction. As illustrated in FIG. 6, the score data 20A is divided into a plurality of blocks, the blocks being image areas 22A. To each image area 22A, a number k (k=1, 2, . . . j−1, j, j+1 . . . ) is given for distinguishing it. Note that when each image area is distinguished, it is described as an image area 22Aj. The image area 22A is an area surrounding one grand staff and notes, symbols, and so on belonging to the one grand staff. For example, the image area 22A is an area such that the one grand staff is arranged in a center, a position higher by a predetermined margin than a highest portion among notes and so on higher than a top line of the one grand staff is the upper boundary of the image area 22A, and a position lower by a predetermined margin than a lowest portion among notes and so on lower than a bottom line of the one grand staff is the lower boundary of the image area 22A. In addition, a middle of vertically adjacent grand staves may be a boundary of the image area 22A. Further, a music name part in the score may be handled similarly to the grand staff.

This concludes the configuration of the score displaying apparatus 1A.

Next, operation of the score displaying apparatus 1A and a mode of use by a user will be described.

FIG. 7 is a flowchart illustrating a process executed by the controller 11 according to the score display program 141A. An instruction to start execution of the score display program 141A is similar to that in the first embodiment. First, the controller 11 allows the user to select a score to be displayed on the screen of the user I/F 12 (SB110) similarly to step SA110 in the first embodiment. Next, the controller 11 judges whether or not a score is selected (SB120). When no score is selected (No in SB120), the controller 11 judges whether or not generation of new score data 20A is instructed (SB130). When generation of new score data 20A is instructed (Yes in SB130), the controller 11 allows the user to select a set of score source data to be the source of the score data 20A (SB140). The score source data is image data of a score of, for example, a PDF file or the like, and is prepared by the user in advance. Note that the score source data is equivalent to the score data 20 in the first embodiment. When score source data is selected, the controller 11 analyzes the selected score source data (SB150). By this analysis, elements such as grand staves, bars, notes, symbols, and so on in the score source data are recognized. Regarding the analysis of score source data, a conventional art, for example, JP H05(1993)-035924 A, JP H06(1994)-102869 A, JP H06(1994)-102870 A, JP H06(1994)-102871 A, or the like may be used. Next, the controller 11 generates score data 20A from the score source data analyzed in step SB150 and writes the score data 20A in the non-volatile storage 14 (SB160). Describing more specifically, the controller 11 sections the score source data, from which grand staves and so on are recognized by the analysis, into blocks corresponding to a plurality of respective image areas 22A based on the recognized grand staves and so on, and numbers the respective image areas 22A. Thus, the score data 20A is generated. When the new score data 20A is generated, the controller 11 returns to step SB110 and allows the user to select a score to be displayed on the screen of the user I/F 12 among choices including the new score data 20A. Note that when there is no instruction to generate new score data 20A (No in SB130), the controller 11 returns to the process of step SB120.

When a score is selected in step SB120 (Yes in SB120), the controller 11 first reads the score data 20A corresponding to the selected score from the non-volatile storage 14 (SB170). Next, the controller 11 performs a process of sequentially aligning and displaying images (namely, grand staves) indicated by the score data in a plurality of consecutive image areas 22A in the vertical direction of the screen of the user I/F 12 (SB180). This will be described in more detail. When each grand staff is displayed, the controller 11 defines the top left corner of the screen of the user I/F 12 as the origin of a coordinate system of the screen, and defines the top left corner of each image area 22A as the origin of a coordinate system of the image area 22A. Then, the controller 11 disposes the top left corner (origin of the image area 22A1) of the earliest image area 22A (for example, the first image area 22A1) among the plurality of consecutive image areas 22A to be displayed, at the top left corner of the screen (origin in the coordinate system of the screen). The controller 11 obtains coordinates of the bottom left corner of the earliest image area 22A in the coordinate system of the screen from the size of the earliest image area 22A. The controller 11 disposes the top left corner (for example, the origin of the image area 22A2) of one later image area 22A (for example, the second image area 22A2) of the earliest image area 22A at coordinates immediately below the bottom left corner of the earliest image area 22A. Thereafter, the image areas 22A to be displayed are aligned sequentially downward from the top end of the screen in a similar manner. Thus, the grand staves belonging to the aligned image areas 22A are displayed on the screen as exemplified in FIG. 8.

Next, turning over of a score will be described. The controller 11 judges whether or not information indicating an input operation by the user is obtained from the user I/F 12 (not illustrated). The controller 11 repeats the judgment of whether or not the information indicating an input operation is obtained until the information indicating an input operation by the user is obtained. When the information indicating an input operation is obtained, the controller 11 judges whether or not the obtained information indicating an input operation is a turn-over instruction to proceed the score on the image area 22A to which one grand staff among the plurality of grand staves displayed on the screen of the user I/F 12 belongs (SB190). This will be described more specifically. When the user performs an upward flick on the screen of the position where the one grand staff among the plurality of grand staves displayed on the screen of the user I/F 12 is displayed, the controller 11 recognizes coordinates on the screen at which the upward flick operation is performed from the information indicating the upward flick operation, and recognizes the image area 22A corresponding to the recognized coordinates from disposition information of the image areas 22A in the coordinate system of the screen. Then, the controller 11 judges that the obtained information indicating the upward flick operation is a turn-over instruction to proceed the score on the recognized image area 22A (that is, the image area 22A to which the one grand staff specified by the upward flick operation of the user belongs).

When the obtained information indicating the input operation is the turn-over instruction to proceed the score on one image area 22A (Yes in SB190), the controller 11 performs a process of step SB200 which is a turn-over process of proceeding the score. The turn-over process of proceeding the score will be described using a specific example. FIG. 9A to FIG. 9C are schematic diagrams illustrating an example of screen transition by the turn-over process of proceeding the score. In the example of FIG. 9A to FIG. 9C, contents displayed on the screen of the user I/F 12 change in the order of FIG. 9A to FIG. 9C according to the turn-over process. FIG. 9A illustrates a state that the image area 22A1 to which the first grand staff (D1 in the figures) belongs, the image area 22A2 to which the second grand staff (D2 in the figures) belongs, the image area 22A3 to which the third grand staff (D3 in the figures) belongs, the image area 22A4 to which the fourth grand staff (D4 in the figures) belongs, and the image area 22A5 to which the fifth grand staff (D5 in the figures) belongs are disposed in this order from a top end to a bottom end of the screen. In this state, it is assumed that the controller 11 obtains a turn-over instruction to proceed the score on the image area 22A3 (that is, information indicating an upward flick operation on a portion where the grand staff D3 is displayed on the screen). The controller 11 which obtained the instruction performs a process of scrolling the image areas 22A upward on the screen of the user I/F 12, disposing the image area 22A3 on which the turn-over instruction is accepted at a highest level of the screen of the user I/F 12, sequentially aligning a plurality of consecutive image areas 22A in the forward direction on the timeline of the score below the image area 22A3, and displaying the image areas on the screen of the user I/F 12 (FIG. 7: SB200, FIG. 9B and FIG. 9C). Describing in more detail, the controller 11 performs a process of moving the image area 22A3 so that the top left corner of the image area 22A3 on which the turn-over instruction is accepted overlaps with the top left corner of the screen, moving the image areas 22A4 and 22A5 below the image area 22A3 upward according to the movement of the image area 22A3, moving the image area 22A6 upward so that the top left corner of the image area 22A6 is located at coordinates immediately below the bottom left corner of the image area 22A5, and moving the image area 22A7 upward so that the top left corner of the image area 22A7 is located at coordinates immediately below the bottom left corner of the image area 22A6. At this time, the controller 11 produces an animation such that the image areas 22A scroll gradually upward as illustrated in FIG. 9B. Further, the controller 11 displays a marker 24 (for example, a light blue bar) on each of the left edge and the right edge of the image area 22A3 on which the turn-over instruction is given. This marker 24 allows the user to easily visually recognize the grand staff D3 on which the turn-over instruction is given. After step SB200, the controller 11 returns to the process of judging whether or not the information indicating an input operation by the user is obtained from the user I/F 12 and the process of analyzing information indicating the input operation (SB190).

When the obtained information indicating an input operation is not the turn-over instruction to proceed the score on the image area 22A (No in SB190), the controller 11 judges whether or not the obtained information indicating an input operation is a turn-over instruction to reverse the score on the image area 22A to which one grand staff among the plurality of grand staves displayed on the screen of the user I/F 12 belongs (SB210). This will be described in more detail. When the user performs a downward flick on the screen of the position where the one grand staff among the plurality of grand staves displayed on the screen of the user I/F 12 is displayed, the controller 11 recognizes coordinates on the screen where the downward flick operation is performed from information indicating the downward flick operation, and recognizes the image area 22A corresponding to the recognized coordinates from disposition information of the image areas 22A in the coordinate system of the screen. Then, the controller 11 judges that the obtained information indicating the downward flick operation is a turn-over instruction to reverse the score on the recognized image area 22A (that is, the image area 22A to which the one grand staff specified by the downward flick operation of the user belongs).

In step SB210, when the obtained information indicating an input operation is not the turn-over instruction to reverse the score on the one image area 22A (No in SB210), the controller 11 judges whether or not the obtained information indicating an input operation is an end instruction of the score display program 141A (not illustrated). When it is the end instruction of the score display program 141A, the controller 11 finishes the score display program 141A, or when it is not the end instruction of the score display program 141A, the controller 11 returns to the process of judging whether or not the information indicating an input operation by the user is obtained from the user I/F 12 and the process of analyzing information indicating the input operation (SB190). On the other hand, when the obtained information indicating an input instruction is the turn-over instruction to reverse the score on the one image area 22A (Yes in SB210), the controller 11 performs a process of step SB220 which is a turn-over process to reverse the score.

The turn-over process of reversing the score will be described using a specific example. FIG. 10A to FIG. 10C are schematic diagrams illustrating an example of screen transition by the turn-over process of reversing the score. In the example of FIG. 10A to FIG. 10C, contents displayed on the screen of the user I/F 12 change in the order of FIG. 10A to FIG. 10C according to the turn-over process. FIG. 10A illustrates a state that the image area 22A4 to which the grand staff D4 belongs, the image area 22A5 to which the grand staff D5 belongs, the image area 22A6 to which the grand staff D6 belongs, the image area 22A7 to which the grand staff D7 belongs, and the image area 22A8 to which the grand staff D8 belongs are disposed in this order of from a top end to a bottom end of the screen. In this state, it is assumed that the controller 11 obtains a turn-over instruction to reverse the score on the image area 22A6 (that is, information indicating a downward flick operation on a portion where the grand staff D6 is displayed on the screen). The controller 11 which obtained this instruction performs a process of scrolling the image areas 22A downward on the screen of the user I/F 12, disposing the image area 22A6 on which the turn-over instruction is accepted at a lowest level of the screen of the user I/F 12, sequentially aligning a plurality of consecutive image areas 22A in the backward direction on the timeline of the score above the image area 22A6, and displaying the image areas on the screen of the user I/F 12 (FIG. 7: SB220, FIG. 10B and FIG. 10C). Describing in more detail, the controller 11 performs a process of moving the image area 22A6 so that coordinates of the bottom left corner of the image area 22A6 on which the turn-over instruction is accepted overlaps with the bottom left corner of the screen, moving the image areas 22A4 and 22A5 above the image area 22A6 downward according to the movement of the image area 22A6, moving the image area 22A3 downward so that the bottom left corner of the image area 22A3 is located at coordinates immediately above the top left corner of the image area 22A4, and moving the image area 22A2 downward so that the bottom left corner of the image area 22A2 is located at coordinates immediately above the top left corner of the image area 22A3. At this time, the controller 11 produces an animation such that the image areas 22A scroll gradually downward as illustrated in FIG. 10B. Further, similarly to the turn-over process of proceeding the score, the controller 11 displays the marker 24 on each of the left edge and the right edge of the image area 22A6 on which the turn-over instruction is given. After step SB220, the controller 11 returns to the process of judging whether or not the information indicating an input operation by the user is obtained from the user I/F 12 and the process of analyzing information indicating the input operation (SB190). Note that although the mode of displaying five grand staves on the screen has been described, the number of grand staves to be displayed on the screen is not limited to this.

Since the score displaying apparatus 1A according to this embodiment is similar to the score displaying apparatus 1 according to the first embodiment excluding that the turning over is performed in unit of grand staff instead of turning over in unit of page, effects similar to those of the first embodiment can be obtained also in this embodiment. Further, since the turn-over operation is performed on the image area 22A to which one grand staff among a plurality of grand staves displayed on the screen of the user I/F 12 belongs, the user can change the turn-over range by changing the area where the turn-over instruction is performed. For example, when the turn-over instruction to proceed the score is performed on the image area 22A3 to which the grand staff D3 belongs in a state that the grand staff D1 to the grand staff D5 are displayed, the grand staff D3 to the grand staff D7 are displayed on the screen, whereas when the turn-over instruction to proceed the score is performed on the image area 22A4 to which the grand staff D4 belongs in a state that the grand staff D1 to the grand staff D5 are displayed, the grand staff D4 to the grand staff D8 are displayed on the screen. Thus, the user can flexibly perform the turn-over operation during performance. Also in this point, a score displaying apparatus with high convenience can be provided.

Further, in the score displaying apparatus 1A according to this embodiment, since turning over is performed in unit of grand staff, it is not always unnecessary to display grand staves of one page on the screen. Thus, the screen size of the user I/F 12 can be reduced in comparison with the score displaying apparatus 1 of the first embodiment. Further, when the screen size of the user I/F 12 is different in each of a plurality of score displaying apparatuses 1A (for example, the aspect ratio of the screen is different), the plurality of score displaying apparatuses 1A can be handled similarly by changing the number of grand staves to be displayed on the screen of the user I/F 12, or the like.

Further, for example, when there is an excessively wide marginal portion above the grand staff located at a highest level of each page, or when there is an excessively wide marginal portion below the grand staff located at a lowest level of each page, the size of the image area 22A may be adjusted appropriately so that the marginal portion has an appropriate margin size. This is because each grand staff can be displayed on the screen of the user I/F 12 with the excessively wide portion in the marginal portion being omitted. Thus, the screen of the user I/F 12 can be utilized effectively.

<Third Embodiment>

The score displaying apparatus 1A according to the second embodiment is for performing turning over in unit of grand staff. On the other hand, a score displaying apparatus 1B according to a third embodiment of the present invention performs turning over in unit of bar. FIG. 11 is a block diagram illustrating a configuration of the score displaying apparatus 1B according to the third embodiment. As illustrated in FIG. 11, the score displaying apparatus 1B according to this embodiment is different from the score displaying apparatus 1A according to the second embodiment in that it has a score display program 141B instead of the score display program 141A, and score data 20B instead of the score data 20A.

The score display program 141B is different from the score display program 141A according to the second embodiment in processes executed by the controller 11. The processes executed by the controller 11 according to the score display program 141B will be described in detail in a description of operation.

The score data 20B is different from the score data 20A according to the second embodiment in that a score image indicated by the score data 20B is divided into a plurality of blocks to be sectioned by every bar. FIG. 12 is a conceptual diagram illustrating a structure of the score data 20B. In FIG. 12, the score data 20B is illustrated as a picture image. FIG. 12 illustrates a style in which only one grand staff is displayed, and a plurality of bars are aligned in a lateral direction of the screen and displayed. As illustrated in FIG. 12, the score data 20B is divided into a plurality of blocks, the blocks being image areas 22B. To each image area 22B, a number k (k=1, 2, . . . j−1, j, j+1 . . . ) is given for distinguishing it. Note that when each image area is distinguished, it is described as an image area 22Bj. The image area 22B is an area surrounding one bar and notes, symbols, and so on belonging to the one bar, and has a bar line as a boundary with an adjacent image area 22B. In addition, a G-clef or the like on a left edge of the grand staff may be handled to be included in the image area 22B to which a first bar belongs, or may be handled independently from the image area 22B to which the initial bar belongs.

This concludes the configuration of the score displaying apparatus 1B.

Next, operation of the score displaying apparatus 1B and a mode of use by a user will be described.

FIG. 13 is a flowchart illustrating a process performed by the controller 11 of the score displaying apparatus 1B according to the score display program 141B after the score to be displayed on the screen is selected (that is, processes corresponding to SB170 to SB220 of FIG. 7 of the second embodiment). Note that the score data 20B is generated similarly to the score data 20A of the second embodiment. First, the controller 11 reads the score data 20B corresponding to the selected score from the non-volatile storage 14 (SC110). Next, the controller 11 performs a process of aligning images (that is, bars) indicated by the score data 20B inside the plurality of consecutive image areas 22B in the lateral direction of the screen of the user I/F 12 and displaying the images (SC120). This will be described in more detail. The controller 11 disposes the top left corner (origin of the image area 22B1) of the earliest image area 22B (for example, the first image area 22B1) among the plurality of consecutive image areas 22B to be displayed at the top left corner of the screen (origin in the coordinate system of the screen). The controller 11 obtains coordinates of the top right corner of the earliest image area 22B in the coordinate system of the screen from the size of the earliest image area 22B. The controller 11 disposes the top left corner (origin of the image area 22B2) of one later image area 22B (for example, the second image area 22B2) of the earliest image area 22B at coordinates of immediately right of the top right corner of the earliest image area 22B. Thereafter, the image areas 22B to be displayed are aligned sequentially rightward from the left end of the screen in a similar manner. Thus, the bars belonging to the aligned image areas 22B are displayed on the screen.

Next, turning over of a score will be described. The controller 11 judges whether or not information indicating an input operation by the user is obtained from the user I/F 12 (not illustrated). The controller 11 repeats the judgment of whether or not the information indicating an input operation is obtained, until the information indicating an input operation by the user is obtained. When the information indicating an input operation is obtained, the controller 11 judges whether or not the obtained information indicating an input operation is a turn-over instruction to proceed the score on the image area 22B to which one bar among the plurality of bars displayed on the screen of the user I/F 12 belongs (SC130). This will be described more specifically. When the user performs a leftward flick on the screen of the position where the one bar among the plurality of bars displayed on the screen of the I/F 12 is displayed, the controller 11 recognizes coordinates on the screen where the leftward flick operation is performed from the information indicating the leftward flick operation, and recognizes the image area 22B corresponding to the recognized coordinates from disposition information of the image areas 22B in the coordinate system of the screen. Then, the controller 11 judges that the obtained information indicating the leftward flick operation is a turn-over instruction to proceed the score on the recognized image area 22B (that is, the image area 22B to which the one bar specified by the leftward flick operation of the user belongs).

When the obtained information indicating the input operation is the turn-over instruction to proceed the score on one image area 22B (Yes in SC130), the controller 11 performs a process of step SC140 which is a turn-over process of proceeding the score. The turn-over process of proceeding the score will be described using a specific example. FIG. 14A to FIG. 14C are schematic diagrams illustrating an example of screen transition by the turn-over process of proceeding the score. In the example of FIG. 14A to FIG. 14C, contents displayed on the screen of the user I/F 12 change in the order of FIG. 14A to FIG. 14C according to the turn-over process. FIG. 14A illustrates a state that the image area 22B1 to which the first bar (S1 in the figures) belongs, the image area 22B2 to which the second bar (S2 in the figures) belongs, the image area 22B3 to which the third bar (S3 in the figures) belongs, and the image area 22B4 to which the fourth bar (S4 in the figures) belongs are disposed in this order from a left end to a right end of the screen. In this state, it is assumed that the controller 11 obtains a turn-over instruction to proceed the score on the image area 22B3 (that is, information indicating a leftward flick operation on a portion where the bar S3 is displayed on the screen). The controller 11 which obtained this instruction performs a process of scrolling the image areas 22B leftward on the screen of the user I/F 12, disposing the image area 22B3 on which the turn-over instruction is accepted in a leftmost position of the screen of the user I/F 12, sequentially aligning a plurality of consecutive image areas 22B in the forward direction on the timeline of the score in a rightward direction of the image area 22B3, and displaying the image areas on the screen of the user I/F 12 (FIG. 13: SC140, FIG. 14B and FIG. 14C). Describing in more detail, the controller 11 performs a process of moving the image area 22B3 so that the top left corner of the image area 22B3 (origin of the image area 22B3) on which the turn-over instruction is accepted overlaps with the top left corner of the screen (origin of the coordinate system of the screen), moving the image areas 22B4 on the right side of the image area 22B3 leftward according to the movement of the image area 22B3, moving the image area 22B5 leftward so that the top left corner of the image area 22B5 is located at coordinates of immediately right of the top right corner of the image area 22B4, and moving the image area 22B6 leftward so that the top left corner of the image area 22B6 is located at coordinates of immediately right of the top right corner of the image area 22B5. At this time, the controller 11 produces an animation such that the image areas 22B scroll gradually leftward as illustrated in FIG. 14B. Further, the controller 11 displays a marker 24 (for example, a light blue bar) on each of the upper edge and the lower edge of the image area 22B3 on which the turn-over instruction is given. After step SC140, the controller 11 returns to the process of judging whether or not the information indicating an input operation by the user is obtained from the user I/F 12 and the process of analyzing information indicating the input operation (SC130).

When the obtained information indicating an input operation is not the turn-over instruction to proceed the score on one image area 22B (No in SC130), the controller 11 judges whether or not the obtained information indicating an input operation is a turn-over instruction to reverse the score on the image area 22B to which one bar among the plurality of bars displayed on the screen of the user I/F 12 belongs (SC150). This will be described in more detail. When the user performs a rightward flick on the screen of the position where the one bar among the plurality of bars displayed on the screen of the user I/F 12 is displayed, the controller 11 recognizes coordinates on the screen where the rightward flick operation is performed from the information indicating the rightward flick operation, and recognizes the image area 22B corresponding to the recognized coordinates from disposition information of image areas 22B in the coordinate system of the screen. Then, the controller 11 judges that the obtained information indicating the rightward flick operation is a turn-over instruction to reverse the score on the recognized image area 22B (that is, the image area 22B to which the one bar specified by the rightward flick operation of the user belongs).

In step SC150, when the obtained information indicating an input operation is not the turn-over instruction to reverse the score on the one image area 22B (No in SC150), the controller 11 judges whether or not the obtained information indicating an input operation is an end instruction of the score display program 141B (not illustrated). When it is the end instruction of the score display program 141B, the controller 11 finishes the score display program 141B, or when it is not the end instruction of the score display program 141B, the controller 11 returns to the process of judging whether or not the information indicating an input operation by the user is obtained from the user I/F 12 and the process of analyzing information indicating the input operation (SB190). On the other hand, when the obtained information indicating an input instruction is the turn-over instruction to reverse the score on the one image area 22B (Yes in SC150), the controller 11 performs a process of step SC160 which is a turn-over process to reverse the score.

The turn-over process of reversing the score will be described using a specific example. FIG. 15A to FIG. 15C are schematic diagrams illustrating an example of screen transition by the turn-over process of reversing the score. In the example of FIG. 15A to FIG. 15C, contents displayed on the screen of the user I/F 12 change in the order of FIG. 15A to FIG. 15C according to the turn-over process. FIG. 15A illustrates a state that the image area 22B4 to which the bar S4 belongs, the image area 22B5 to which the bar S5 belongs, the image area 22B6 to which the bar S6 belongs, and the image area 22B7 to which the bar S7 belongs are disposed in this order from a left end to a right end of the screen. In this state, it is assumed that the controller 11 obtains a turn-over instruction to reverse the score on the image area 22B5 (that is, information indicating a rightward flick operation on a portion where the bar S5 is displayed on the screen). The controller 11 which obtained this instruction performs a process of scrolling the image areas 22B rightward on the screen of the user I/F 12, disposing the image area 22B5 on which the turn-over instruction is accepted in a rightmost position of the screen of the user I/F 12, sequentially aligning a plurality of consecutive image areas 22B in the backward direction on the timeline of the score in the leftward direction of the image area 22B5, and displaying the image areas on the screen of the user I/F 12 (FIG. 13: SC160, FIG. 15B and FIG. 15C). Describing in more detail, the controller 11 performs a process of moving the image area 22B5 so that the top right corner of the image area 22B5 on which the turn-over instruction is accepted overlaps with the top right corner of the screen, moving the image areas 22B4 of left of the image area 22B5 rightward according to the movement of the image area 22B5, moving the image area 22B3 rightward so that the top right corner of the image area 22B3 is located at coordinates of immediately left of the top left corner of the image area 22B4, and moving the image area 22B2 rightward so that the top right corner of the image area 22B2 is located at coordinates of immediately left of the top left corner of the image area 22B3. At this time, the controller 11 produces an animation such that the image areas 22B scroll gradually rightward as illustrated in FIG. 15B. Further, similarly to the turn-over process of proceeding the score, the controller 11 displays the marker 24 on each of the upper edge and the lower edge of the image area 22B5 on which the turn-over instruction is given. After step SC160, the controller 11 returns to the process of judging whether or not the information indicating an input operation by the user is obtained from the user I/F 12 and the process of analyzing information indicating the input operation (SC130). Note that although the mode of displaying four bars on the screen has been described, the number of bars to be displayed on the screen is not limited to this.

Since the score displaying apparatus 1B according to this embodiment is thus similar to the score displaying apparatus 1A according to the second embodiment excluding that the turning over is performed in unit of bar, effects similar to those of the second embodiment can be obtained in this embodiment. Further, the score displaying apparatus 1B according to this embodiment allows to further reduce the screen size of the user I/F 12 in comparison with the score displaying apparatus 1A of the second embodiment.

<Fourth Embodiment>

The score displaying apparatus 1A according to the second embodiment performs scrolling so that the grand staff of the image area 22A on which a turn-over instruction is accepted is displayed at the highest level or the lowest level of the screen. On the other hand, a score displaying apparatus 1C according to a fourth embodiment of the present invention replaces part of grand staves among displayed grand staves with other grand staves by the turn-over instruction. FIG. 16 is a block diagram illustrating a configuration of the score displaying apparatus 1C according to the fourth embodiment. As illustrated in FIG. 16, the score displaying apparatus 1C according to this embodiment is different from the score displaying apparatus 1A according to the second embodiment in that the score displaying apparatus 1C has a score display program 141C instead of the score display program 141A. The score display program 141C is different from the score display program 141A according to the second embodiment in processes executed by the controller 11.

FIG. 17 is a flowchart illustrating a process performed by the controller 11 of the score displaying apparatus 1C according to the score display program 141C after the score is displayed on the screen (that is, processes corresponding to SB190 to SB220 of FIG. 7 of the second embodiment). Same reference numerals are given to processes similar to those of FIG. 7, and descriptions thereof are omitted. When the obtained information indicating an input operation is a turn-over instruction to proceed the score on the one image area 22A (Yes in SB190), the controller 11 performs a process of step SD120 as a turn-over process of proceeding the score. Further, when the obtained information indicating an input operation is a turn-over instruction to reverse the score on the one image area 22A (Yes in SB210), the controller 11 performs a process of step SD140 as a turn-over process of reversing the score.

A turn-over process of proceeding the score according to this embodiment will be described using a specific example. FIGS. 18A to 18E are schematic diagrams illustrating an example of screen transition by the turn-over process of proceeding the score. FIG. 18A illustrates a state that the image area 22A1 to which the grand staff D1 belongs, the image area 22A2 to which the grand staff D2 belongs, the image area 22A3 to which the grand staff D3 belongs, the image area 22A4 to which the grand staff D4 belongs, the image area 22A5 to which the grand staff D5 belongs, and the image area 22A6 to which the grand staff D6 belongs are disposed in this order from a top end to a bottom end of the screen. In this state, it is assumed that the controller 11 obtains a turn-over instruction to proceed the score on the image area 22A5 (that is, information indicating an upward flick operation on a portion where the grand staff D5 is displayed on the screen). The controller 11 which obtained this instruction performs a process of displaying a plurality of consecutive grand staves in the forward direction on the timeline of the score with respect to the latest grand staff D6 among the grand staves displayed on the screen (namely, the grand staff D7, the grand staff D8, . . . ), in place of grand staves D1 to D4 in the backward direction on the timeline of the score with respect to the grand staff D5 inside the image area 22A5 on which the turn-over instruction is accepted, in an order from the earliest grand staff among the grand staves displayed on the screen (SD120). Thus, the screen changes from the state of FIG. 18A to the state of FIG. 18B. Describing in more detail, the controller 11 disposes the image area 22A7 to which the grand staff D7 belongs in a position where the image area 22A1 to which the grand staff D1 belongs is disposed. Similarly, the controller 11 disposes the image area 22A8 to which the grand staff D8 belongs in a position where the image area 22A2 to which the grand staff D2 belongs is disposed, disposes the image area 22A9 to which the grand staff D9 belongs in a position where the image area 22A3 to which the grand staff D3 belongs is disposed, and disposes the image area 22A10 to which the grand staff D10 belongs in a position where the image area 22A4 to which the grand staff D4 belongs is disposed. After step SD120, the controller 11 returns to the process of step SB190.

Further, in the state of FIG. 18B, when information indicating an input operation is obtained and the obtained information indicating the input operation is a turn-over instruction to proceed the score on the image area 22A9 to which the grand staff D9 belongs (Yes in SB190), the controller 11 disposes the image area 22A11 to which the grand staff D11 belongs in a position where the image area 22A5 to which the grand staff D5 belongs is disposed. Similarly, the controller 11 disposes the image area 22A12 to which the grand staff D12 belongs in a position where the image area 22A6 to which the grand staff D6 belongs is disposed, disposes the image area 22A13 to which the grand staff D13 belongs in a position where the image area 22A7 to which the grand staff D7 belongs is disposed, and disposes the image area 22A14 to which the grand staff D14 belongs in a position where the image area 22A8 to which the grand staff D8 belongs is disposed. Thus, the screen changes from the state of FIG. 18B to the state of FIG. 18C.

A turn-over process of reversing the score according to this embodiment will be described using a specific example. FIGS. 19A to 19C are schematic diagrams illustrating an example of screen transition by the turn-over process of reversing the score. FIG. 19A illustrates a state that the image area 22A13, the image area 22A14, the image area 22A9, the image area 22A10, the image area 22A11, and the image area 22A12 are disposed in this order from a top end to a bottom end of the screen. In this state, it is assumed that the controller 11 obtains a turn-over instruction to reverse the score on the image area 22A10 (that is, information indicating a downward flick operation on a portion where the grand staff D10 is displayed on the screen). The controller 11 which obtained this instruction performs a process of displaying a plurality of consecutive grand staves in the backward direction on the timeline of the score with respect to the earliest grand staff D9 among the grand staves displayed on the screen (namely, the grand staff D8, the grand staff D7, . . . ), in place of grand staves D11 to D14 in the forward direction on the timeline of the score with respect to the grand staff D10 inside the image area 22A10 on which the turn-over instruction is accepted, in an order from the latest grand staff among the grand staves displayed on the screen (SD140). Thus, the screen changes from the state of FIG. 19A to the state of FIG. 19B. Describing in more detail, the controller 11 disposes the image area 22A8 to which the grand staff D8 belongs in a position where the image area 22A14 to which the grand staff D14 belongs is disposed. Similarly, the controller 11 disposes the image area 22A7 to which the grand staff D7 belongs in a position where the image area 22A13 to which the grand staff D13 belongs is disposed, disposes the image area 22A6 to which the grand staff D6 belongs in a position where the image area 22A12 to which the grand staff D12 belongs is disposed, and disposes the image area 22A5 to which the grand staff D5 belongs in a position where the image area 22A11 to which the grand staff D11 belongs is disposed. After step SD140, the controller 11 returns to the process of SB190.

In the state of FIG. 19B, information indicating an input operation is obtained, and when the obtained information indicating the input operation is the turn-over instruction to reverse the score on one image area 22A5 to which the grand staff D5 belongs (No in SB190, Yes in SB210), the controller 11 disposes the image area 22A4 to which the grand staff D4 belongs in a position where the image area 22A10 to which the grand staff D10 belongs is disposed. Similarly, the controller 11 disposes the image area 22A3 to which the grand staff D3 belongs in a position where the image area 22A9 to which the grand staff D9 belongs is disposed, disposes the image area 22A2 to which the grand staff D2 belongs in a position where the image area 22A8 to which the grand staff D8 belongs is disposed, and disposes the image area 22A1 to which the grand staff D1 belongs in a position where the image area 22A7 to which the grand staff D7 belongs is disposed. In this case, since the image area 22A1 is the earliest image area 22A among the generated image areas 22A, the image area 22A6 is disposed continuously in the position where the image area 22A6 has been disposed. Thus, the screen changes from the state of FIG. 19B to the state of FIG. 19C.

In addition, the controller 11 may produce an animation when the turn-over process to proceed the score or the turn-over process to return the score is performed (for example, an animation of gradual replacement, or the like), similarly to the second embodiment. Further, the controller 11 may display a marker on each of the left edge and the right edge of the image area 22A on which the turn-over instruction is given, similarly to the second embodiment. Further, the mode of displaying six grand staves on the screen has been described, the number of grand staves to be displayed on the screen is not limited to this.

Since the score displaying apparatus 1C according to this embodiment is similar to the score displaying apparatus 1A according to the second embodiment excluding that the turning over is performed by replacing grand staves, effects similar to those of the second embodiment can be obtained also in this embodiment.

Further, in the score displaying apparatus 1C according to this embodiment, since a grand staff inside the image area 22A on which the turn-over instruction is accepted does not move on the screen, the user need not move his or her line of sight to the grand staff inside the image area 22A on which the turn-over instruction is accepted accompanying turning over. Therefore, in the score displaying apparatus 1C, it is possible to reduce the influence on performance by moving the line of sight when turning over.

Further, a display indicating that the timeline of the score is not continuous may be provided at a boundary portion where the timeline of the score is not continuous on the screen. For example, a display representing a cut line of paper may be provided at a boundary portion between the imaging area 22A10 of the grand staff D10 and the image area 22A of the grand staff D5 in the screen of FIG. 18B. In this manner, the user can more easily recognize the boundary portion where the timeline of the score is not continuous, and can more easily grasp what timing the next turn-over instruction should be given.

<Fifth Embodiment>

The first to the fourth embodiments are presented as specific embodiments of the score displaying apparatus of the present invention. In a fifth embodiment, a score displaying apparatus in which features of these first to fourth embodiments are combined will be described.

FIG. 20 is a flowchart illustrating a process performed by a control circuit (specifically, a controller 11) of a score displaying apparatus of this embodiment (specifically, score displaying apparatuses 1 to 1C). As illustrated in FIG. 20, a control circuit of the score displaying apparatus of this embodiment starts execution of a score display program (specifically, score display programs 141 to 141C) in response to an instruction from a user, and first generates score data (specifically, score data 20 to 20B) of the score of the display target (SE110). This score data is a set of data in which the display target score is sectioned into a plurality of consecutive predetermined areas along a timeline of the score. Next, the control circuit extracts a plurality of consecutive areas along the timeline of the score from among all the sectioned areas (SE120). At this time, the control circuit determines one area from among all the sectioned areas as an area of an extraction start point and extracts, with the area of the extraction start point being a start point, a plurality of consecutive areas in the forward direction along the timeline of the score. Next, the control circuit displays scores inside the extracted areas on the display (specifically, the user I/F 12) (SE130). Thus, scores inside a plurality of temporally consecutive areas including the area of the extraction start point are displayed on the display.

Next, the control circuit obtains the turn-over instruction on one area of the displayed score via an input portion (specifically, the user I/F 12) (SE140). Specifically, the turn-over instruction is information indicating turning over on a score inside one area among scores inside a plurality of extracted temporally consecutive areas. The control circuit performs a process of shifting the extraction start point by one or a plurality of areas to the forward direction or the backward direction along the timeline of the score in response to acceptance of the turn-over instruction (SE150). Next, the control circuit extracts, with the extraction start point shifted in step SE150 being a start point of extraction, a plurality of consecutive areas in the forward direction along the timeline of the score, the plurality of consecutive areas including the area on which the turn-over instruction is accepted (SE160). Then, the control circuit displays on the display the score inside the extracted areas after the extraction start point is shifted (SE130).

In this manner, with the score displaying apparatus of this embodiment, turning over is performed while the score inside the area on which the turn-over instruction is accepted is kept displayed on the display. Accordingly, stopping of performance because of a turn-over operation by the user can be avoided, and the risk of stopping performance can be decreased. Further, since the scores of a plurality of areas among the scores sectioned into predetermined areas (specifically, page, grand staff, bar, note, or the like) on the timeline of the score are displayed on the screen of the display, it will not happen that the score is cut in the vicinity of a center of the screen of the display (for example, a grand staff or the like is cut into an upper and a lower part) and displayed.

FIG. 21 is a diagram illustrating functions of respective components of the score displaying apparatus of this embodiment. The user I/F of the score displaying apparatus has a display function and an input function. More specifically, the user I/F has a function to display a plurality of consecutive areas of a score, and a function to obtain the turn-over instruction. Further, the controller of the score displaying apparatus 1E has a score data generating function, a function to extract a plurality of consecutive areas of a score, a function to shift the extraction start point along the timeline of the score, and a function to extract a plurality of consecutive areas including an area on which the turn-over instruction is accepted. In the score displaying apparatus, by the controller executing the score display program, these functions are realized in the controller and the user I/F.

Further, more preferably, the control circuit performs a process of displaying the plurality of consecutive areas of the score along the timeline of the score on a screen of the display such that the areas are aligned in an order according to the timeline of the score, and performs, in response to acceptance of the turn-over instruction on one area among the score displayed on the display via an input portion, a process of shifting the extraction start point to the forward direction along the timeline of the score such that the area on which the turn-over instruction is accepted becomes an area indicating the extraction start point; extracting the plurality of consecutive areas along the timeline of the score from the shifted extraction start point and aligning the areas in an order according to the timeline of the score; and displaying the score of the extracted plurality of areas while scrolling the score on the display, or a process of shifting the extraction start point to the backward direction along the timeline of the score such that the area on which the turn-over instruction is accepted becomes an area indicating an extraction end point; extracting the plurality of consecutive areas along the timeline of the score from the shifted extraction start point to the extraction end point and aligning the areas in an order according to the timeline of the score; and displaying the score of the extracted plurality of areas while scrolling the score on the display. The score displaying apparatuses 1 to 1B of the first to third embodiments are one embodiment of this mode.

<Sixth Embodiment>

The score displaying apparatus 1 of the first embodiment operates in a display mode displaying a score on a screen in page unit (hereinafter called a page display mode). The score displaying apparatus 1A of the second embodiment operates in a display mode displaying a score on the screen in grand staff unit (hereinafter called a grand staff display mode). The score displaying apparatus 1B of the third embodiment operates in a display mode displaying a score on the screen in bar unit (hereinafter called a bar display mode). A score displaying apparatus 1F according to a sixth embodiment of the present invention includes a process of determining a display mode to operate from among such various display modes. The score displaying apparatus 1F includes components similar to those of the score displaying apparatuses 1 to 1B.

In the score displaying apparatus 1F, the shape of the screen of the user I/F 12 is rectangular. Further, the score displaying apparatus 1F further has an attitude detecting sensor (not illustrated) detecting the attitude of the screen of the user I/F 12 and outputting a result thereof. The attitude detecting sensor is, for example, a geomagnetic sensor. More specifically, when the screen is tilted relative to the ground surface (that is, the screen is not substantially horizontal to the ground), the attitude detecting sensor sequentially detects whether a long side of the screen is retained closer to vertical than to horizontal (in other words, whether the screen is retained in a vertically long attitude), or a long side of the screen is retained close to horizontal than to vertical (in other words, whether the screen is retained in a laterally long attitude). Then, the attitude detecting sensor sequentially outputs a detection result thereof to the controller 11. For example, when a portable terminal such as a tablet or a smart phone is made to function as the score displaying apparatus 1F, the geomagnetism sensor incorporated in the portable terminal may be used as the attitude detecting sensor of this embodiment.

The score displaying apparatus 1F includes an n-up display mode displaying a list of a score of n (n is plural) pages on the screen as one mode of display modes. FIG. 22 and FIG. 23 are views illustrating an example of the screen when scores are displayed in the n-up display mode. FIG. 22 illustrates a screen when scores are displayed in the 4-up display mode displaying scores of four pages on the screen retained in a vertically long attitude. FIG. 23 illustrates a screen when scores are displayed in the 8-up display mode displaying scores of eight pages on the screen retained in a laterally long attitude.

The controller 11 of the score displaying apparatus 1F of this embodiment determines a display mode to operate according to the attitude of the screen of the user I/F 12 as a detection result of the attitude detecting sensor and display magnification indicating the size of a score to be displayed. Thus, the non-volatile storage 14 stores the initial value of this display magnification in advance.

To the controller 11, information indicating a change in display magnification is inputted via the user I/F 12. An operation to change the display magnification by the user is, for example, a pinch-in or a pinch-out. The pinch-in is an operation to move two fingers placed on the screen closer to each other. The pinch-in is an operation to decrease the display magnification by the amount corresponding to the amount of change in interval of the fingers in comparison with that before the pinch-out. The pinch-out is an operation to move two fingers placed on the screen away from each other. The pinch-out is an operation to increase the display magnification by the amount corresponding to the amount of change in interval of the fingers in comparison with that before the pinch-out.

When the attitude of the screen changes, the display magnification changes, or both the attitude and the display magnification of the screen change, the controller 11 determines a display mode according to the attitude of the screen and the display magnification after the change. Thus, in the score displaying apparatus 1F, the display mode (specifically, the page display mode, the grand staff display mode, the bar display mode and the n-up display mode) switches to another display mode (specifically, the page display mode, the grand staff display mode, the bar display mode and the n-up display mode) according to the attitude of the screen and value of the display magnification. Note that this switching of display mode includes switching from an n-up display mode to an n-up display mode having a different page number.

FIG. 24 is a flowchart illustrating a process performed by the controller 11 of the score displaying apparatus 1F of this embodiment. Step SA110 to step SA130 illustrated in FIG. 24 are similar to those illustrated in FIG. 2, and thus descriptions thereof are omitted.

After reading the selected score data 20 (step SA130), the controller 11 of the score displaying apparatus 1F sequentially obtains a detection result on whether the screen of the user I/F 12 is retained in a vertically long attitude or retained in a laterally long attitude, from the attitude detecting sensor (SF110). Next, the controller 11 reads an initial value of the set display magnification into the volatile storage 13 (SF120). Next, the controller 11 determines the display mode according to the detection result of the attitude detecting sensor and the read display magnification (SF130). Then, the controller 11 displays the score in the determined display mode (SF140).

Steps SF130 and SF140 will be described in more detail. When the detection result of the attitude detecting sensor indicates that the screen is retained in a vertically long attitude and the read display magnification is equal to or more than a predetermined threshold (for example, when the display magnification is 100% or more), the controller 11 performs control to display the score in the grand staff display mode. In this case, the controller 11 extracts consecutive image areas to which a grand staff belongs by the amount according to the read display magnification. For example, when the display magnification is 100%, the controller 11 extracts consecutive image areas of one page (for example, image areas of the grand staves D1 to D6 of FIG. 9A), and meanwhile, when the display magnification is larger than 100% (for example, when the display magnification is 120% or the like), the controller 11 extracts a number of image areas (for example, image areas of the grand staves D1 to D5 of FIG. 9A) less than that in one page.

When the detection result of the attitude detecting sensor indicates that the screen is retained in a vertically long attitude and the read display magnification is less than a predetermined threshold (for example, when the display magnification is less than 100%), the controller 11 performs control to display the score in the n-up display mode. In this case, the controller 11 extracts consecutive image areas to which a page belongs by the amount according to the read display magnification. For example, when the display magnification is 25%, the controller 11 extracts image areas of four consecutive pages (for example, image areas of pages P1 to P4 of FIG. 22). In addition, when the display magnification is further smaller, the controller 11 may display the score in a 16-up display mode, or the like.

When the detection result of the attitude detecting sensor indicates that the screen is retained in a laterally long attitude and the read display magnification is within a predetermined range (for example, when the display magnification is more than 12.5% and less than 200%), the controller 11 performs control to display the score in the page display mode. In this case, the controller 11 extracts image areas of two consecutive pages (for example, image areas of pages P1 and P2 of FIG. 3A).

When the detection result of the attitude detecting sensor indicates that the screen is retained in a laterally long attitude and the read display magnification exceeds the upper limit of the predetermined range (for example, when the display magnification exceeds 200%), the controller 11 performs control to display the score in the bar display mode. In this case, the controller 11 extracts image areas of a plurality of consecutive bars (for example, image areas of bars S1 to S4 of FIG. 14A).

When the detection result of the attitude detecting sensor indicates that the screen is retained in a laterally long attitude and the read display magnification falls below the lower limit of a predetermined threshold, the controller 11 performs control to display the score in the n-up display mode. In this case, the controller 11 extracts consecutive image areas to which a page belongs by the amount according to the read display magnification. For example, when the display magnification is 12.5%, the controller 11 extracts image areas of eight consecutive pages (for example, image areas of pages P1 to P8 of FIG. 23). In addition, when the display magnification is further smaller, the controller 11 may display the score in a 18-up display mode, or the like.

In a state of operating in each display mode, the controller 11 judges whether or not information obtained via the user I/F 12 indicates a turn-over instruction (SF150). When the obtained information indicates the turn-over instruction (Yes in SF150), the controller 11 performs the turn-over process in the present display mode (SF160). This turn-over process is similar to the process related to the turning over described in the above-described embodiments, and thus a description thereof is omitted. Then, the controller 11 displays the score after the turn-over process on the screen (SF140).

On the other hand, in a state of operating in each display mode, when the information obtained via the user I/F 12 does not indicate the turn-over instruction (No in SF140), the controller 11 judges whether the obtained information indicates a pinch-in or not, or indicates a pinch-out or not (SF170). When the obtained information indicates a pinch-in (Yes in SF170), the controller 11 decreases the display magnification by the amount corresponding to the operating amount of the pinch-in in comparison with that before the operation of pinch-in (SF180), or when the obtained information indicates a pinch-out (Yes in SF170), the controller 11 increases the display magnification by the amount corresponding to the operating amount of the pinch-out in comparison with that before the operation of pinch-out (SF180). The controller 11 stores the display magnification after the change in the volatile storage 13. Thereafter, the controller 11 determines the display mode again according to the display magnification stored in the volatile storage 13 (that is, the display magnification after changed in step SF180) and the detection result of the attitude detecting sensor (SF130). At this time, depending on the value of the display magnification after the change, the controller 11 determines a display mode different from the display mode before the change of the display magnification. Thus, the display mode is switched.

Specific examples of switching the display mode due to change of the display magnification will be described.

In the first example, it is assumed that the controller 11 displays a score in the grand staff display mode on the screen retained in a vertically long attitude as illustrated in FIG. 9A. In this state, when the user performs a pinch-in on the screen, the controller 11 obtains information indicating this pinch-in (Yes in SF170). The controller 11 changes the display magnification, for example, from 100% to 25% according to the operating amount of the pinch-in (SF180). Thereafter, the controller 11 determines the display mode again based on the detection result indicating that the screen is retained to be vertically long and the display magnification of 25% after the change (SF130). In this example, the display magnification is smaller than the predetermined threshold, and thus the controller 11 switches the display mode from the grand staff display mode to the 4-up display mode. At this time, the controller 11 determines that the image area to which the page including the grand staff at the highest level just before switch of the display mode belongs is an image area at the extraction start point. Then, the controller 11 extracts the image areas of four temporally consecutive pages from the image area at the extraction start point. Then, the controller 11 displays the score in the 4-up display mode on the screen retained in the vertically long attitude, as illustrated in FIG. 22.

In the second example, it is assumed that the controller 11 displays a score in the 4-up display mode on the screen retained in a vertically long attitude as illustrated in FIG. 22. In this state, when the user performs a pinch-out in a portion where the third page P3 is displayed on the screen, the controller 11 obtains information indicating the pinch-out (Yes in SF170). The controller 11 changes the display magnification, for example, from 25% to 100% according to the operating amount of the pinch-out (SF180). Thereafter, the controller 11 determines the display mode again based on the detection result indicating that the screen is retained in the vertically long attitude and the display magnification of 100% after the change (SF130). In this example, the display magnification is equal or larger than the predetermined threshold, and thus the controller 11 switches the display mode from the 4-up display mode to the grand staff display mode. At this time, since the pinch-out is performed in the portion where the third page P3 is displayed on the screen, the controller 11 determines that the image area to which the grand staff at the highest level in the third page P3 (grand staff D11 in FIG. 22) belongs is an image area at the extraction start point. The controller 11 extracts the image areas of temporally consecutive grand staves of one page (grand staves D11 to D15 in the example of FIG. 22) from this image area at the extraction start point. Then, the controller 11 displays the score of the page specified by the pinch-out in the grand staff display mode on the screen retained in the vertically long attitude, as illustrated in FIG. 25.

In the third example, it is assumed that the controller 11 displays a score in the page display mode on the screen retained in a laterally long attitude as illustrated in FIG. 3A. In this state, when the user performs a pinch-in on the screen, the controller 11 obtains information indicating this pinch-in (Yes in SF170). The controller 11 changes the display magnification, for example, from 100% to 12.5% according to the operating amount of the pinch-in (SF180). Thereafter, the controller 11 determines the display mode again based on the detection result indicating that the screen is retained in the laterally long attitude and the display magnification of 12.5% after the change (SF130). In this example, the display magnification falls below the lower limit of the predetermined range, and thus the controller 11 switches the display mode from the page display mode to the 8-up display mode. At this time, the controller 11 determines that an earlier page immediately before switching the display mode is an image area at the extraction start point, and extracts the image areas of eight temporally consecutive pages from the image area at the extraction start point. Then, the controller 11 displays the score in the 8-up display mode on the screen retained in the laterally long attitude, as illustrated in FIG. 23.

In the fourth example, it is assumed that the controller 11 displays a score in the 8-up display mode on the screen retained in a laterally long attitude as illustrated in FIG. 23. In this state, when the user performs a pinch-out in a portion where the third page P3 is displayed on the screen, the controller 11 obtains information indicating this pinch-out (Yes in SF170). The controller 11 changes the display magnification, for example, from 12.5% to 100% according to the operating amount of the pinch-out (SF180). Thereafter, the controller 11 determines the display mode again based on the detection result indicating that the screen is retained to be laterally long and the display magnification of 100% after the change (SF130). In this example, the display magnification is within the predetermined range, and thus the controller 11 switches the display mode from the 8-up display mode to the page display mode. At this time, since the pinch-out is performed in the portion where the third page P3 is displayed on the screen, the controller 11 determines that the image area to which the third page P3 belongs is an image area at the extraction start point, and extracts the image areas of two temporally consecutive pages (pages P3 and P4 in the example of FIG. 26) from the image area at the extraction start point. Then, the controller 11 displays the score including the page specified by the pinch-out in the page display mode on the screen retained in the laterally long attitude, as illustrated in FIG. 26.

In the fifth example, it is assumed that the controller 11 displays a score in the page display mode on the screen retained in a laterally long attitude as illustrated in FIG. 3A. In this state, when the user performs a pinch-out in a portion where the third grand staff from the top of the first page is displayed on the screen, the controller 11 obtains information indicating this pinch-out (Yes in SF170). The controller 11 changes the display magnification, for example, from 100% to 200% according to the operating amount of the pinch-out (SF180). Thereafter, the controller 11 determines the display mode again based on the detection result indicating that the screen is retained to be laterally long and the display magnification 200% which is the display magnification after the change (SF130). In this example, the display magnification exceeds the upper limit of the predetermined range, and thus the controller 11 switches the display mode from the page display mode to the bar display mode. At this time, since the pinch-out is performed in a portion where the third grand staff from the top of the first page is displayed on the screen, the controller 11 determines an image area to which the leftmost bar of the third grand staff from the top of the first page belongs is an image area at the extraction start point, and extracts the image areas of temporally consecutive bars of one grand staff (S9 to S12 in the example of FIG. 27) from the image area at the extraction start point. Then, the controller 11 displays the score including the grand staff specified by the pinch-out in the bar display mode on the screen retained in the laterally long attitude, as illustrated in FIG. 27.

This concludes the specific examples of switching of the display mode in response to change of the display magnification.

In the flowchart of FIG. 24, when the obtained information does not indicate either a pinch-in or a pinch-out (No in SF170), the controller 11 judges whether or not the obtained information indicates that the attitude of the screen is changed (SF190). More specifically, the controller 11 judges whether a detection result of the attitude detecting sensor obtained immediately previously and a detection result of the attitude detecting sensor obtained this time are different or not. For example, when the detection result of the attitude detecting sensor obtained immediately previously indicates that the screen is retained in the vertically long attitude, and the detection result of the attitude detecting sensor obtained this time indicates that the screen is retained in the laterally long attitude, the obtained information indicates that the attitude of the screen is changed. When the obtained information indicates that the attitude of the screen is changed (Yes in SF190), the controller 11 determines the display mode again based on a detection result of the attitude of the screen obtained this time (in other words, a detection result of the attitude of the screen after the change) and the display magnification stored in the volatile storage 13 (in other words, the present display magnification) (SF130). In this case, since the attitude of the screen is changed, the display mode is switched.

Specific examples of switching the display mode due to change in attitude of the screen will be described.

In the sixth example, it is assumed that the controller 11 displays a score in the grand staff display mode on the screen retained in a vertically long attitude by display magnification of 100% as illustrated in FIG. 9A. In this state, it is assumed that the user moves the screen so that the screen is in a laterally long attitude. In this case, the attitude detecting sensor detects that the screen is retained in the laterally long attitude in response to the movement of the screen, and the controller 11 obtains a detection result thereof. A detection result indicating the vertically long attitude obtained immediately previously and the detection result indicating the laterally long attitude obtained this time are different (Yes in SF190), and thus the controller 11 determines the display mode again based on the detection result indicating the laterally long attitude obtained this time and the display magnification of 100% as the present display magnification (SF130). In this example, the controller 11 switches the display mode from the grand staff display mode to the page display mode. At this time, the controller 11 determines that the image area to which the page including the grand staff at the highest level belonged immediately previously to the switch of the display mode is an image area at the extraction start point, and extracts the image areas of two temporally consecutive pages from the image area at the extraction start point. Then, the controller 11 displays the score in the page display mode on the screen retained in the laterally long attitude, as illustrated in FIG. 4A.

In the seventh example, it is assumed that the controller 11 displays a score in the page display mode on the screen retained in a laterally long attitude by display magnification of 100% as illustrated in FIG. 4A. In this state, it is assumed that the user moves the screen so that the screen is in the vertically long attitude. In this case, the attitude detecting sensor detects that the screen is retained in the vertically long attitude in response to the movement of the screen, and the controller 11 obtains a detection result thereof. A detection result indicating the laterally long attitude obtained immediately previously and the detection result indicating the vertically long attitude obtained this time are different (Yes in SF190), and thus the controller 11 determines the display mode again based on the detection result indicating the vertically long attitude obtained this time and the display magnification of 100% as the present display magnification (SF130). In this example, the controller 11 switches the display mode from the page display mode to the grand staff display mode. At this time, the controller 11 determines, for example, that the image area to which the grand staff at the highest level of the leftmost page belonged immediately previously to the switch of the display mode is an image area at the extraction start point, and extracts the temporally consecutive image areas of one page from the image area at the extraction start point. Then, the controller 11 displays the score in the grand staff display mode on the screen retained in the vertically long attitude, as illustrated in FIG. 9A.

This concludes the specific examples of switching of the display mode in response to change of the display magnification.

In the flowchart of FIG. 24, when the obtained information does not indicate a change in attitude of the screen (No in SF190), the controller 11 returns to step SF150, and repeats the processes of steps SF150 to SF190 with respect to information obtained next time. Further, when the information obtained after the display mode is switched in response to a pinch-in or pinch-out or a change in attitude of the screen (SF130) indicates the turn-over instruction (Yes in SF150), the controller 11 performs the turn-over process in the display mode after the switch (SF160).

This concludes the flow of the processes performed by the controller 11 of the score displaying apparatus 1F.

Note that the specific mode of switching of the display mode is not limited to the above-described specific examples.

As has been described, in the score displaying apparatus 1F according to this embodiment, the display mode is determined based on the attitude of the screen and the display magnification of the score. Accordingly, the user can switch the display mode of the score displaying apparatus 1F to a desired display mode by changing the attitude of the screen or performing an operation of changing the display magnification of the score. Therefore, the score displaying apparatus 1F is highly convenient for the user.

In addition, information directly specifying the display magnification may be inputted to the controller 11 via the user I/F 12.

Note that in the second specific example of this embodiment, in a state that the score is displayed on the screen in the 4-up display mode, when the user performs a pinch-out in the portion where the third page P3 is displayed on the screen, the controller 11 performs a process of displaying the third page in the grand staff display mode. However, the operation of the user for displaying a desired page of the score displayed in the n-up display mode in the grand staff display mode is not limited to the pinch-out. For example, the operation of the user for displaying a desired page of the score displayed in the n-up display mode in the grand staff display mode may be a long tap or the like. This mode can be realized by the controller 11 performing a process of judging whether or not the immediately previous display mode is the n-up display mode and the obtained information indicates a long tap on a portion where the desired page is displayed on the screen.

In addition, the controller 11 may automatically adjust the display magnification so that the score is displayed by matching with the size of the screen when the display mode is determined (SF130) and the score is displayed on the screen in the determined display mode (SF140). For example, when the screen is retained in the vertically long attitude, the controller 11 automatically adjusts the display magnification so that a lateral width of each page of the score is substantially the same as a short side of the screen. Further, when the screen is retained in the laterally long attitude, the controller 11 automatically adjusts the display magnification so that a vertical width of each bar of the score is substantially the same as a short side of the screen. Moreover, when the screen is retained in the laterally long attitude, more preferably, the controller 11 automatically adjusts the display magnification of respective bars after a vertical width of each bar is investigated through all the bars from the first bar to the last bar of the score, such that the largest vertical width becomes substantially the same as a short side of the screen, and intervals of the stave in the bar with the largest vertical width and intervals of the stave in another bar are the same through all the bars. This is because it is quite difficult to see when the interval of staff changes in middle of the music.

Note that the relation between the attitude of the screen and the type of the display mode are not limited to the above-described specific examples. For example, the controller 11 may display the score in the bar display mode on the screen retained in the vertically long attitude in response to an operation of the user I/F 12 by the user, or the like. This mode is preferred for displaying a score having a large number of parts. Further, for example, the controller 11 may display the score in the grand staff display mode on the screen retained in the laterally long attitude in response to an operation of the user I/F 12 by the user, or the like.

<Other Embodiments>

The first to sixth embodiments of the present invention have been described above, but other embodiments are conceivable for this invention. Examples are given below.

(1) The score data 20 to 20B of the above-described embodiments are sectioned into pages, grand stave or bars. However, the areas to section score data are not limited to them. For example, score data may be sectioned into notes. In this mode, for example, a boundary of adjacent image areas may be provided between adjacent notes in a picture image of score data. Further, it is also possible to make the turn-over unit changeable in response to an operation by the user. For example, when the controller obtains information indicating a flick operation starting in a position where a note is displayed on the screen, the turn-over process is performed in note unit, or when the controller obtains information indicating a flick operation starting in a position where no note is displayed on the screen, the turn-over process is performed in bar unit. Further, there are also examples such that when information indicating a flick operation with a stylus pen is obtained, the controller performs the turn-over process in note unit, or when information indicating a flick operation with a finger is obtained, the controller performs the turn-over process in bar unit.

(2) The controller 11 according to the above-described embodiments obtains information indicated by a flick operation as the turn-over instruction. However, the turn-over instruction is not limited to ones given by the flick operation. For example, the controller 11 may obtain information indicated by a single-tap operation as the turn-over instruction to proceed the score, and may obtain information indicated by a double-tap operation as the turn-over instruction to reverse the score. Further, for example, in the first embodiment, information indicating a tap operation on the right half of the screen of the user I/F 12 may be obtained as the turn-over instruction to proceed the score, and information indicating a tap operation on the left half of the screen of the user I/F 12 may be obtained as the turn-over instruction to reverse the score. In addition, preferably, an operation which is simple and can be inputted quickly, such as flick or tap, is the turn-over operation.

(3) The score displaying apparatus 1A according to the second embodiment performs turning over so that the grand staff of the image area 22A on which the turn-over instruction is accepted is displayed at a highest level or a lowest level of the screen. However, the score displaying apparatus is not limited to the mode of displaying the grand staff of the image area 22A on which the turn-over instruction is accepted is displayed at a highest level or a lowest level of the screen. The score displaying apparatus may at least be one which includes a display, an input portion, and a control circuit performing a process of extracting a plurality of consecutive areas from among a score being sectioned into predetermined areas based on a timeline of the score and displaying the extracted areas on the display, and performs, in response to acceptance of a turn-over instruction on one area of the score displayed on the display via the input portion, shifting an extraction start point by one or a plurality of areas to a forward direction or a backward direction along the timeline of the score; extracting a plurality of consecutive areas including the area on which the turn-over instruction is accepted; and displaying the extracted areas on the display. At this time, since the area on which the turn-over instruction is accepted is included even after the extraction start point is shifted, and thus the amount of shifting of the extraction start point needs to be less than the number of areas to be extracted. In this mode, the score displaying apparatus may shift the extraction start point (perform turning over) by the number of areas set in advance, or may change the amount of shifting of the extraction start point (amount of turning over) by a specific style of the turn-over instruction (for example, the number of taps on the screen). For example, in a state that the first to fifth grand staves are displayed on the screen, once obtained information indicating a double-tap on the screen by the user on the image area 22A4 to which the fourth grand staff belongs, the score displaying apparatus displays the third to seventh grand staves shifted only by two areas on the screen. Also in this embodiment, effects similar to those of the second embodiment can be obtained. Further, in this embodiment, the user can perform a more variety of turning over. Note that it is not limited to the case where the image area is in grand staff unit, and the same applies to the cases of page unit, bar unit, and note unit. Further, it is not limited to the case of scrolling the image area, and the same applies to the case of stacking scores inside the image area or the case of replacing the image area.

(4) Further, the number of plural consecutive areas to be extracted (that is, the number of grand staves or the like to be displayed on the screen) may be specified by the user. Further, for example, grand staves or the like may be enlarged or reduced and displayed according to the number of grand staves or the like so that grand staves or the like of the number specified by the user are displayed over the entire screen, or a part (for example, a margin) of a grand staff or the like may be displayed to overlap with a back side of an adjacent grand staff. In this manner, for example, all grand staves in a plurality of consecutive areas can be displayed without cutting a grand staff at a lowest level or a highest level of the screen into an upper and a lower part. Further, the range of plural consecutive areas may be different among the areas. For example, the number of parts in a grand staff may change in middle of the music. Also in this case, by enlarging or reducing the grand staff and so on, or alternatively, by overlapping a part of the grand staff when displaying it, effects similar to the above-described modes can be obtained.

(5) The grand staff of the image area on which the turn-over instruction to proceed the score or the turn-over instruction to reverse the score is accepted may be displayed in a center of the screen. For example, once obtained the turn-over instruction to proceed the score on the grand staff D5 in the state of FIG. 9A, the controller 11 may scroll respective image areas so that the grand staff D5 is displayed at the center of the screen. In this case, the grand staff D3, the grand staff D4, the grand staff D5, the grand staff D6, and the grand staff D7 are displayed in this order on the screen from an upper end to a lower end. The same applies to the cases of page unit, bar unit, and note unit.

(6) Further, the grand staff of an image area next to the image area on which the turn-over instruction to proceed the score is accepted may be displayed at a highest level of the screen. For example, once obtained the turn-over instruction to proceed the score on the grand staff D3 in the state of FIG. 9A, the controller 11 may scroll respective image areas so that the grand staff D4 next to the grand staff D3 is displayed at the highest level of the screen. In this case, the grand staff D4, the grand staff D5, the grand staff D6, the grand staff D7, and the grand staff D8 are displayed in this order on the screen from an upper end to a lower end. Similarly, the grand staff of an image area previous to the image area on which the turn-over instruction to reverse the score is accepted may be displayed at a lowest level of the screen. For example, once obtained the turn-over instruction to reverse the score on the grand staff D6 in the state of FIG. 10A, the controller 11 may scroll respective image areas so that the grand staff D5 previous to the grand staff D6 is displayed at the lowest level of the screen. In this case, the grand staff D1, the grand staff D2, the grand staff D3, the grand staff D4, and the grand staff D5 are displayed in this order on the screen from an upper end to a lower end. Further, the mode of displaying the grand staff of the image area on which the turn-over instruction is accepted at the highest level or lowest level of the screen and the mode of displaying the grand staff next or previous to the image area on which the turn-over instruction is accepted at the highest level or lowest level of the screen may be switchable by an operation by the user. For example, when the turn-over instruction to proceed the score on an upper half area of an image area is obtained, the grand staff of the image area may be displayed at the highest level of the screen, whereas when the turn-over instruction to proceed the score on a lower half area of the image area is obtained, the grand staff of an image area next to the image area may be displayed at the highest level of the screen. Further, for example, when information indicating a flick with one finger on an image area is obtained, the grand staff of the image area may be displayed at the highest level of the screen, whereas when information indicating a flick with two fingers on an image area is obtained, the grand staff of an image area next to the image area may be displayed at the highest level of the screen. Note that it is not limited to the case where the image area is in grand staff unit, and the same applies to the cases where it is in page unit, bar unit, and note unit. For example, in the mode in which the image area is in bar unit, once obtained the turn-over instruction to proceed the score on the bar S3 in the state of FIG. 14A, the controller 11 scrolls respective image areas so that the bar S4 next to the bar S3 is displayed in the leftmost position of the screen. Further, for example, when the turn-over instruction to proceed the score on a left half area of an image area is obtained, the bar of the image area may be displayed on the leftmost position of the screen, whereas when the turn-over instruction to proceed the score on a right half area of the image area is obtained, the bar of an image area next to the image area is displayed on the rightmost position of the screen.

(7) In the second embodiment, regarding the image area in a lowest level after a scrolling is performed according to the turn-over instruction to proceed the score, a part of the image area may be displayed on the screen instead of the entire image area. For example, it is conceivable that, in FIG. 9C, a lower side portion of the grand staff D7 is not displayed on the screen, but an upper side portion of the grand staff D7 is displayed on the screen. Similarly, regarding the image area in a highest level after a scrolling is performed according to the turn-over instruction to reverse the score, a part of the image area may be displayed on the screen instead of the entire image area. For example, it is conceivable that, in FIG. 10C, an upper side portion of the grand staff D2 is not displayed on the screen, but a lower side portion of the grand staff D2 is displayed on the screen. Further, in the third embodiment, regarding the rightmost image area after a scrolling is performed according to the turn-over instruction to proceed the score, a part of the image area may be displayed on the screen instead of the entire image area. Similarly, regarding the leftmost image area after a scrolling is performed according to the turn-over instruction to reverse the score, a part of the image area may be displayed on the screen instead of the entire image area. Further, in the fourth embodiment, regarding the latest image area after a replacement is performed according to the turn-over instruction to proceed the score, a part of the image area may be displayed on the screen instead of the entire image. Similarly, regarding the earliest image area after a replacement is performed according to the turn-over instruction to reverse the score, a part of the image area may be displayed on the screen instead of the entire image area.

(8) In the above-described embodiments, while a part of a displayed portion of a score is displayed on the screen, another part is turned over. However, a mode of turning over the entire displayed portion of the score may be used together. For example, in the mode of turning over pages of the first embodiment, it is conceivable that a process of turning over one of the scores of the two pages displayed on the screen is performed when information indicating a flick is detected in the vicinity of a center of the screen, or a process of turning over both the scores of the two pages displayed on the screen is performed when the information indicating a flick is detected in the vicinity of a periphery of the screen. Further, in the mode of turning over pages of the first embodiment, it is conceivable that a process of turning over one of the scores of the two pages displayed on the screen is performed when information indicating a flick with one finger on the image area is obtained, or a process of turning over both the scores of the two pages is performed when information indicating a flick with two fingers on the image area is obtained. That is, how many pages turning over is to be performed on may be determined depending on the specific style (type) of the obtained turn-over instruction. Thus, a more variety of turning over can be performed depending on a situation of performance.

(9) In the score displaying apparatus 1 according to the first embodiment, the turn-over process is performed so that the score of one page is stacked on the score of another page. However, the turn-over process may be performed so that the score of one page is scrolled onto a position where the score of another page is displayed. Further, as exemplified in FIG. 28A and FIG. 28B, a plurality of pages more than two may be displayed on the screen, and the turn-over process may be performed to stack so that pages are scrolled by every page or pages are stacked. At this time, the controller 11 may display a plurality of pages in a lateral direction of the screen, and may perform, similarly to the second and third embodiments, when the turn-over instruction on one page is obtained, a process of scrolling or stacking the score of each page leftward or rightward so that the score of the page on which the turn-over instruction is accepted is displayed on the leftmost portion or the rightmost portion of the screen. Specifically, as illustrated in FIG. 28A, in a state that the page P1 is displayed on a left side of the screen, the page P2 is displayed in a center of the screen, and the page P3 is displayed on a right side of the screen, it is assumed that the controller 11 obtains the turn-over instruction to proceed the score on the page P2. In this case, as illustrated in FIG. 28A, the controller 11 performs a process so that the page P2 on which the turn-over instruction is accepted is displayed on the left side, the page P3 is displayed in the center of the screen, and the page P4 next to the page P3 is displayed on the right side of the screen. In addition, when the pages are scrolled, for example, a turn-over animation of turning over a page of a book may be produced. Further, the controller 11 may perform the turn-over process to stack a grand staff, a bar, or the like similarly to the page in the first embodiment.

(10) In the score displaying apparatus 1A according to the second embodiment, the score data 20A is provided such that one grand staff is included in one image area 20A. However, the score data may be provided such that a plurality of (two for example) grand staves are included in one image area. In this mode, the turn-over process of grand staves may be performed with two grand staves being one unit. The same applies to the fourth embodiment. Note that the first embodiment performing turning over by pages is one example of including a plurality of grand staves in one image area. Further, in the score displaying apparatus 1B according to the third embodiment, the score data 20B is provided such that one bar is included in one image area 20B, but the score data may be provided such that a plurality of (two for example) bars are included in one image area.

(11) In the score displaying apparatus 1C according to the fourth embodiment, the turn-over process is performed so as to replace grand staves. However, the turn-over process may be performed so as to replace pages, bars, or the like.

(12) The image area 22A in the second embodiment is an area surrounding one grand staff and notes, symbols, and so on belonging to the one grand staff, and adjacent image areas 22A do not overlap with each other. However, the range of image areas may be determined such that adjacent image areas 22A overlap with each other. For example, a range from a bottom line of a grand staff higher by one level than one grand staff to a top line of a grand staff lower by one level than the one grand staff may be determined as the range of the image area of the one grand staff. In this case, the range from the bottom line of the grand staff higher by one level than the one grand staff to the top line of the one grand staff overlaps with another image area in both the image area of the grand staff higher by one level and the image area of the one grand staff, and the range from the top line of the grand staff lower by one level than the one grand staff to the bottom line of the one grand staff overlaps with another image area in both the image area of the grand staff lower by one level and the image area of the one grand staff. When image areas are determined such that adjacent image areas overlap with each other, irrespective of before or after the turn-over process, a comment or the like written in an upper margin or a lower margin of the grand staff can be securely displayed together with the grand staff on the screen. For example, when some grand staff is displayed in a highest level according to the turn-over instruction, a comment or the like written in the upper margin of the grand staff can be securely displayed together with the grand staff on the screen. Further, an image area which does not overlap with the adjacent image areas and an image area which overlaps with the adjacent image area may be mixed. Further, when information indicating an input operation corresponding to the portion where adjacent image areas overlap with each other is obtained, the controller may judge which of the adjacent image areas the information indicating an input operation is for. For example, when the lower margin of one grand staff and an upper margin of a grand staff lower by one level thereof overlap with each other, the controller may judge information indicating an input operation corresponding to an upper half of the overlap portion as information indicating an input operation on the one grand staff, and judge information indicating an input operation corresponding to a lower half of the overlap portion as information indicating an input operation on the grand staff lower by one level. Note that the mode of judgment of information indicating an input operation corresponding to the portion where adjacent image areas overlap with each other is not limited thereto.

(13) In the above-described embodiments, an animation is produced when turning over is performed. The controller 11 may change the speed of the animation when turning over is performed according to a flick speed, a flick amount, or the like. For example, when a turn-over instruction at high flick speed is obtained, the speed of the animation when turning over is performed is increased.

(14) The score display program according to the above-described embodiments is characterized in enabling a computer to function as a control circuit performing a process of extracting a plurality of consecutive areas from among a score being sectioned into predetermined areas based on a timeline of the score and displaying the consecutive areas on a display, the control circuit performing, in response to acceptance of a turn-over instruction on one area of the score displayed on the display via the input portion, a process including: shifting an extraction start point by one or a plurality of areas to a forward direction or a backward direction along the timeline of the score; extracting a plurality of consecutive areas including the area on which the turn-over instruction is accepted; and displaying the extracted areas on the display. This score display program may be traded in a state of being installed in a computer, may be traded in a state of being stored in a computer readable storage medium, or may be traded by downloading via a network. Further, the respective processes in the score display program may be realized by an electronic circuit.

(15) The technical features of the embodiments can be applied to scores of various modes such as a score constituted of one staff notation, a score constituted of a combination of a staff notation and a tablature, and a score constituted of a plurality of parts.

(16) In the first embodiment, the user selects a score to be displayed on the screen of the user I/F 12 by tapping an image indicating one score in a list of displayable scores displayed on the screen of the user I/F 12. However, the selection of the score is not limited to this mode. For example, the score displaying apparatus may narrow candidates for the score to be displayed on the screen from among the plurality of displayable scores, and may allow choosing a score to be displayed on the screen from among the narrowed scores. The score displaying apparatus of this mode, for example, narrows candidates for the score to be displayed on the screen by searching for scores including a phrase similar to a phrase specified by the user from among the plurality of displayable scores. Thus, the score display program of this embodiment includes a subroutine of a search mode of searching for scores including a phrase similar to a phrase specified by the user (hereinafter referred to as a search phrase).

FIG. 29 is a schematic view illustrating an example of a screen when the controller 11 of this modification example displays a list of displayable scores on the screen. In FIG. 29, images illustrating displayable scores M-1 to M-30 (for example, thumbnails) are displayed. In this state of FIG. 29, the user performs an operation indicating starting the search mode on the user I/F 12 in order to efficiently select a score to be displayed. Note that when the list of displayable scores is displayed on the screen, all the thumbnails of the displayable scores need not be displayed in the screen.

FIG. 30 is a flowchart illustrating a process executed according to the score display program by a controller 11 of a score displaying apparatus 1G according to this modification example. Once obtained an instruction to start the search mode from the user I/F 12 (SG110), the controller 11 executes processes of step SG120 and so on according to the subroutine of the search mode. First, the controller 11 reads all score data of displayable scores as search targets to the volatile storage 13 (SG120). Next, the controller 11 obtains a search phrase (SG130). For example, the controller 11 obtains a phrase performed by the user with a musical instrument as the search phrase. In addition, this search phrase may be one obtained in an audio data format via a microphone, or may be one obtained in the MIDI data format from an electronic musical instrument or the like.

Next, the controller 11 compares the search phrase and the phrase in each score as a search target (SG140). That is, the controller 11 judges whether or not the phrase in each score as a search target is similar to the search phrase. Then, the controller 11 determines phrase similarity indicating the degree of similarity between the phrase in each score as a search target and the phrase specified by the user for each score as a search target (SG150).

Next, the controller 11 determines one or more scores having large phrase similarity determined for each score of a search target as candidates for the score to be displayed (SG160). For example, the controller 11 determines as candidates for the score to be displayed scores of the number set in advance in descending order of the phrase similarity among the scores of search targets. Further, as another example, the controller 11 determines as candidates for the score to be displayed all scores with the phrase similarity equal to or more than a threshold set in advance among the scores of search targets.

Next, the controller 11 displays on the screen a list of scores determined as candidates for the score to be displayed (SG170). FIG. 31 is a view illustrating the screen in the state of step SG170. In the example of FIG. 31, the thumbnails of the scores M-1, M-2, M-3 and M-24 determined as candidates are clearly displayed as depicted by solid lines. Further, in the example of FIG. 31, thumbnails of other scores not determined as candidates are not displayed, as depicted by dashed lines. In addition, the scores not determined as candidates may be displayed such that their thumbnails are obscure (for example, pale) to an extent that they can be easily discriminated from the thumbnails of the scores determined as candidates, in comparison with the thumbnails of the scores determined as candidates.

Next, the controller 11 judges whether or not an operation indicating a rearrangement instruction by the user is obtained (SG180). For example, the controller 11 obtains information indicating a tap on a software button for rearrangement of the user I/F 12 as the rearrangement instruction. When the rearrangement instruction is obtained (Yes in SG180), the controller 11 rearranges the order of display of the list of the scores determined as candidates in descending order of the phrase similarity, and displays the scores in the order after being rearranged (SG190). FIG. 32 is a view illustrating the screen after this rearrangement is performed. For example, as illustrated in FIG. 32, the thumbnail of a score having largest phrase similarity is disposed in the top left position of the screen, thumbnails of scores are disposed from left to right of the screen and further from top to bottom of the screen as their phrase similarity decreases. In the example of FIG. 32, a score M-24 with phrase similarity which is next largest to that of score M-3 is disposed on the next right side of the score M-3 by the rearrangement. Further, as in FIG. 32, the thumbnails of scores after the rearrangement may be enlarged in comparison with those before the rearrangement and displayed.

The controller 11 performs a process of step SG200 subsequently to step SG190. Further, the controller 11 performs a process of step SG200 also when the rearrangement instruction is not obtained (No in SG180). In step SG200, the controller 11 judges whether not a predetermined time (five seconds for example) has passed after the list of scores determined as the candidates for the score to be displayed is displayed on the screen (that is, after the process of step SG170 is performed). When this predetermined time has not passed (No in SG200), the controller 11 repeats step SG180 to step SG200 until this predetermined time passes. Then, when the predetermined time has passed (Yes in SG200), the controller 11 automatically selects a score with the largest phrase similarity (SG210) and ends the subroutine of the search mode.

Thus, the score displaying apparatus of this modification example selects the score to be displayed after narrowing candidates for the score to be displayed. This allows the user to easily select the score to be displayed by performing the search phrase. Further, the score displaying apparatus of this modification example is particularly preferred when there is a large number of displayable scores.

Note that after the predetermined time passes (Yes in SG200), the controller 11 of this modification example automatically selects the score with the largest phrase similarity (SG210). However, the mode of automatic choosing of score is not limited to this. For example, the controller 11 may perform a process of judging whether or not the largest phrase similarity becomes equal to or more than a predetermined threshold, and may automatically select, when this largest phrase similarity becomes equal to or more than the predetermined threshold, the score with the largest phrase similarity. Further, after determining candidates of scores and displaying a list of the scores as illustrated in FIG. 31 or after rearranging the candidates of scores and displaying a list of the scores as illustrated in FIG. 32, the controller 11 may obtain an instruction to select a score via the user I/F 12. An example of the instruction to select a score via the user I/F 12 in this case is information indicating a tap on a portion where a desired score is displayed on the screen, or the like.

In addition, after the score with the largest phrase similarity is automatically selected (SG210), the controller 11 may automatically display the selected score on the screen. In this case, the controller 11 may display the score on the screen in a display mode set in advance (for example, the grand staff mode or the like), or may determine a display mode according to conditions set in advance and display the score on the screen in this determined display mode as in the sixth embodiment. Further, the controller 11 may display the score on the screen such that the score of a phrase portion similar to the search phrase is displayed on the screen. In these modes, the number of operations performed by the user decreases, and the user is able to perform music or do practice more smoothly.

Note that after the controller 11 automatically selects the score with the largest phrase similarity, it is possible that the user select again another score within a predetermined time (for example, within five seconds). In this case, the controller 11 may perform a learning process for improving accuracy of algorithm for calculating the phrase similarity. Further, the controller 11 may perform the learning process only when the score after the user selects again is one determined as a candidate to be displayed.

In addition, the phrase specified by the user may be a beginning phrase of a music indicated by the score to be displayed, or may be a phrase in middle of the music.

REFERENCE SIGNS LIST

1, 1A, 1B, 1C . . . score displaying apparatus, 11 . . . controller, 12 . . . user I/F, 13 . . . volatile storage, 14 . . . non-volatile storage, 15 . . . bus, 20, 20A, 20B . . . score data, 22, 22A, 22B . . . image area, 24 . . . marker, 141, 141A, 141B, 141C . . . score display program.

The invention claimed is:

1. A score displaying method performed on an apparatus, the apparatus including a display and an input portion, the method comprising:
    extracting a first plurality of consecutive areas starting from an extraction start point, from among a score sectioned into areas based on a timeline of the score, the first plurality of consecutive areas of the score including three or more sectioned areas;
    displaying the first plurality of consecutive areas of the score extracted by the extracting on the display;
    executing, in response to a turn-over instruction, received via the input portion, on one area among the first plurality of consecutive areas of the score displayed on the display, a process including:
    shifting the extraction start point by one or a plurality of areas to a forward direction or a backward direction along the timeline of the score such that the one area on which the turn-over instruction is accepted becomes the shifted extraction start point in a case where the extraction start point is shifted to the forward direction, and the one area on which the turn-over instruction is accepted becomes an extraction end point and another area from among the score becomes the shifted extraction start point in a case where the extraction start point is shifted to the backward direction;
    extracting a second plurality of consecutive areas, including the one area on which the turn-over instruction is performed, starting from the shifted extraction start point, from among the score sectioned into areas based on the timeline of the score, the second plurality of consecutive areas of the score including three or more sectioned areas; and
    displaying the extracted second plurality of consecutive areas on the display such that display of the one area on which the turn-over instruction is accepted is gradually moved to an end position of a display region on the display in which the score is to be displayed, and an area among the second plurality of consecutive areas which is to be newly displayed appears on the display accompanying the movement.

2. The score displaying method according to claim 1,
    wherein the displaying is displaying the first plurality of consecutive areas of the score along the timeline of the score on a screen of the display such that the first plurality of consecutive areas are aligned in an order along the timeline of the score, and
    wherein in the process,
    the shifting is shifting the extraction start point to the forward direction along the timeline, and the displaying the extracted second plurality of consecutive areas is displaying an area corresponding to the shifted extraction start point in the end position on a backward side along the timeline and displaying an area newly extracted in the extracting the second plurality of consecutive areas due to the shifting of the extraction start point on the display, or
    the shifting is shifting the extraction start point to the backward direction along the timeline, and the displaying the extracted second plurality of consecutive areas is displaying an area corresponding to the extraction end point after the shift in the end position on a forward side along the timeline and displaying an area newly extracted in the extracting the second plurality of consecutive areas due to the shifting of the extraction start point on the display.

3. The score displaying method according to claim 1,
    wherein the displaying is displaying the first plurality of consecutive areas of the score along the timeline of the score on a screen of the display such that the first plurality of consecutive areas are aligned in an order along the timeline of the score, and
    wherein in the process,
    the shifting is shifting the extraction start point to the forward direction along the timeline, and the displaying the extracted second plurality of consecutive areas is displaying the plurality of areas extracted in the extracting the second plurality of consecutive areas such that an area corresponding to the shifted extraction start point is displayed in the end position on a backward side and that the extracted areas are aligned in an order along the timeline and scrolled on the display, or the shifting is shifting the extraction start point to the backward direction along the timeline, and the displaying the extracted second plurality of consecutive areas is displaying the plurality of areas extracted in the extracting the second plurality of consecutive areas such that an area corresponding to the extraction end point after the shift is displayed in the end position on a forward side and that the extracted areas are aligned in an order along the timeline and scrolled on the display.

4. The score displaying method according to claim 1, further comprising detecting an attitude of the display portion;

obtaining, via the input portion, an enlargement factor indicating in which size the score is to be displayed on the display; and deciding an effective mode among a plurality of modes for displaying the score sectioned into areas based on the attitude detected in the detecting and the enlargement factor obtained in the obtaining, wherein units of the sectioning of the score vary for each mode.

5. The score displaying method according to claim 1, wherein display of the one area on which the turn-over instruction is accepted is gradually moved to the end position on the display only after display of an area among the first plurality of consecutive areas on which the turn-over instruction is not performed is reduced.

6. The score displaying method according to claim 1, wherein display of the one area on which the turn-over instruction is accepted is gradually moved to the end position on the display and the area among the second plurality of consecutive areas which is to be newly displayed appears on the display accompanying the movement while continuing to display an area among the first plurality of consecutive areas on which the turn-over instruction is not performed.

7. A non-transitory machine-readable storage medium containing program instructions executable by a computer and enabling the computer to control a display and an input portion and perform a method comprising:

extracting a first plurality of consecutive areas starting from an extraction start point, from among a score sectioned into areas based on a timeline of the score, the first plurality of consecutive areas of the score including three or more sectioned areas;

displaying the first plurality of consecutive areas of the score extracted by the extracting on the display;

executing, in response to a turn-over instruction, received via the input portion, on one area among the first plurality of consecutive areas of the score displayed on the display, a process including:

shifting the extraction start point by one or a plurality of areas to a forward direction or a backward direction along the timeline of the score such that the one area on which the turn-over instruction is accepted becomes the shifted extraction start point in a case where the extraction start point is shifted to the forward direction, and the one area on which the turn-over instruction is accepted becomes an extraction end point and another area from among the score becomes the shifted extraction start point in a case where the extraction start point is shifted to the backward direction;

extracting a second plurality of consecutive areas, including the one area on which the turn-over instruction is performed, starting from the shifted extraction start point, from among the score sectioned into areas based on the timeline of the score, the second plurality of consecutive areas of the score including three or more sectioned areas; and displaying the extracted second plurality of consecutive areas on the display such that display of the one area on which the turn-over instruction is accepted is gradually moved to an end position of a display region on the display in which the score is to be displayed, and an area among the second plurality of consecutive areas which is to be newly displayed appears on the display accompanying the movement.

8. The non-transitory machine-readable storage medium according to claim 7, wherein the displaying is displaying the first plurality of consecutive areas of the score along the timeline of the score on a screen of the display such that the first plurality of consecutive areas are aligned in an order along the timeline of the score, and wherein in the process, the shifting is shifting the extraction start point to the forward direction along the timeline, and the displaying the extracted second plurality of consecutive areas is displaying an area corresponding to the shifted extraction start point in the end position on a backward side along the timeline and displaying an area newly extracted in the extracting the second plurality of consecutive areas due to the shifting of the extraction start point on the display, or the shifting is shifting the extraction start point to the backward direction along the timeline, and the displaying the extracted second plurality of consecutive areas is displaying an area corresponding to the extraction end point after the shift in the end position on a forward side along the timeline and displaying an area newly extracted in the extracting the second plurality of consecutive areas due to the shifting of the extraction start point on the display.

9. The non-transitory machine-readable storage medium according to claim 7, wherein the displaying is displaying the first plurality of consecutive areas of the score along the timeline of the score on a screen of the display such that the first plurality of consecutive areas are aligned in an order along the timeline of the score, and wherein in the process, the shifting is shifting the extraction start point to the forward direction along the timeline, and the displaying the extracted second plurality of consecutive areas is displaying the plurality of areas extracted in the extracting the second plurality of consecutive areas such that an area corresponding to the shifted extraction start point is displayed in the end position on a backward side and that the extracted areas are aligned in an order along the timeline and scrolled on the display, or the shifting is shifting the extraction start point to the backward direction along the timeline, and the displaying the extracted second plurality of consecutive areas is displaying the plurality of areas extracted in the extracting the second plurality of consecutive areas such that an area corresponding to the extraction end point after the shift is displayed in the end position on a forward side and that the extracted areas are aligned in an order along the timeline and scrolled on the display.

10. The non-transitory machine-readable storage medium according to claim 7, wherein the method further comprises:
    detecting an attitude of the display portion;
    obtaining, via the input portion, an enlargement factor indicating in which size the score is to be displayed on the display; and
    deciding an effective mode among a plurality of modes for displaying the score sectioned into areas based on the attitude detected in the detecting and the enlargement factor obtained in the obtaining, wherein units of the sectioning of the score vary for each mode.

11. The non-transitory machine-readable storage medium according to claim 7, wherein display of the one area on which the turn-over instruction is accepted is gradually moved to the end position on the display only after display of an area among the first plurality of consecutive areas on which the turn-over instruction is not performed is reduced.

12. The non-transitory machine-readable storage medium according to claim 7, wherein display of the one area on which the turn-over instruction is accepted is gradually moved to the end position on the display and the area among the second plurality of consecutive areas which is to be newly displayed appears on the display accompanying the movement while continuing to display an area among the first plurality of consecutive areas on which the turn-over instruction is not performed.

\* \* \* \* \*